(12) United States Patent  
Murdoch et al.

(10) Patent No.: US 12,505,424 B2  
(45) Date of Patent: Dec. 23, 2025

(54) DIGITAL WALLET AS A RELYING PARTY IN A DECENTRALIZED NETWORK

(71) Applicant: Microsoft Technology Licensing, LLC, Redmond, WA (US)

(72) Inventors: Brandon Murdoch, Reading (GB); Ankur Patel, Sammamish, WA (US); Frank Michael Chiachiere, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 17/997,514

(22) PCT Filed: Apr. 26, 2021

(86) PCT No.: PCT/US2021/029202  
§ 371 (c)(1),  
(2) Date: Oct. 28, 2022

(87) PCT Pub. No.: WO2021/222122  
PCT Pub. Date: Nov. 4, 2021

(65) Prior Publication Data  
US 2023/0177487 A1 Jun. 8, 2023

(30) Foreign Application Priority Data  
Apr. 28, 2020 (LU) .................................. LU101758

(51) Int. Cl.  
*G06Q 20/36* (2012.01)  
*G06Q 20/40* (2012.01)

(52) U.S. Cl.  
CPC ............. *G06Q 20/36* (2013.01); *G06Q 20/40* (2013.01); *G06Q 2220/00* (2013.01)

(58) Field of Classification Search  
CPC .... G06Q 20/36; G06Q 20/40; G06Q 2220/00; H04L 63/102; H04L 2463/102; H04L 63/123; G06F 21/33; G06F 21/64  
See application file for complete search history.

(56) References Cited

U.S. PATENT DOCUMENTS

2015/0341340 A1 11/2015 Lu et al.  
2020/0127847 A1* 4/2020 Yang .................. H04L 63/0876  
(Continued)

FOREIGN PATENT DOCUMENTS

WO WO-2017210368 A1 * 12/2017 ............. G10L 15/30

OTHER PUBLICATIONS

Manu Sporny, Verifiable Credentials Data Model 1.0, Jul. 2018, W3C, https://w3c.github.io/vc-data-model/WD/2018-07-18/ (Year: 2018).*

(Continued)

*Primary Examiner* — Chunling Ding  
(74) *Attorney, Agent, or Firm* — Workman Nydegger

(57) ABSTRACT

A request is generated for verifiable claims that are related to services that a user is to provide to an entity that requests the services from the user. The request for the services is then provided to the requesting entity. The requested verifiable claims are then received from the requesting entity and are verified to determine that they are valid. If the received verifiable claims are valid, the user is authorized to provide the services to the requesting entity.

15 Claims, 11 Drawing Sheets

(56) References Cited

U.S. PATENT DOCUMENTS

| | | | |
|---|---|---|---|
| 2020/0213311 A1* | 7/2020 | Saha | H04L 9/3268 |
| 2020/0220726 A1* | 7/2020 | Lougheed, III | G06F 16/211 |
| 2020/0374132 A1* | 11/2020 | Lobban | G06Q 10/00 |
| 2020/0389319 A1* | 12/2020 | Wise | H04L 9/3247 |
| 2020/0403805 A1* | 12/2020 | Steele | H04L 9/3242 |
| 2020/0405805 A1* | 12/2020 | Shanks | A61P 29/00 |
| 2021/0036866 A1* | 2/2021 | Zolfonoon | H04L 67/34 |
| 2021/0067340 A1* | 3/2021 | Ferenczi | H04L 9/0825 |
| 2021/0126785 A1* | 4/2021 | Liu | H04L 9/0637 |
| 2021/0218574 A1* | 7/2021 | Mao | H04L 63/04 |

OTHER PUBLICATIONS

Manu Sporny, Verifiable Credentials Data Model 1.0, Nov. 2019, W3C, https://www.w3.org/TR/2019/REC-vc-data-model-20191119/ (Year: 219).*

Aydar, et al., "Towards a Blockchain based digital identity verification, record attestation and record sharing system", In Computer Repository of https://arxiv.org/abs/1906.09791, Jun. 24, 2019, 25 Pages.

Laborde, et al., "A User-Centric Identity Management Framework based on the W3C Verifiable Credentials and the FIDO Universal Authentication Framework", In Proceedings IEEE 17th Annual Consumer Communications & Networking Conference, Jan. 10, 2020, 8 Pages.

"Search Report and Written Opinion Issued in Luxembourg Patent Application No. LU101758", Mailed Date: Dec. 18, 2020, 8 Pages.

"International Search Report and Written Opinion Issued in PCT Application No. PCT/US21/029202", Mailed Date: Jul. 23, 2021, 12 Pages.

Sporny, "Verifiable Credentials Data Model 1.0", Retrieved from: https://www.w3.org/TR/2019/CR-verifiable-claims-data-model-20190328/#sharing-information-with-the-wrong-party, Mar. 28, 2019, 95 Pages.

* cited by examiner

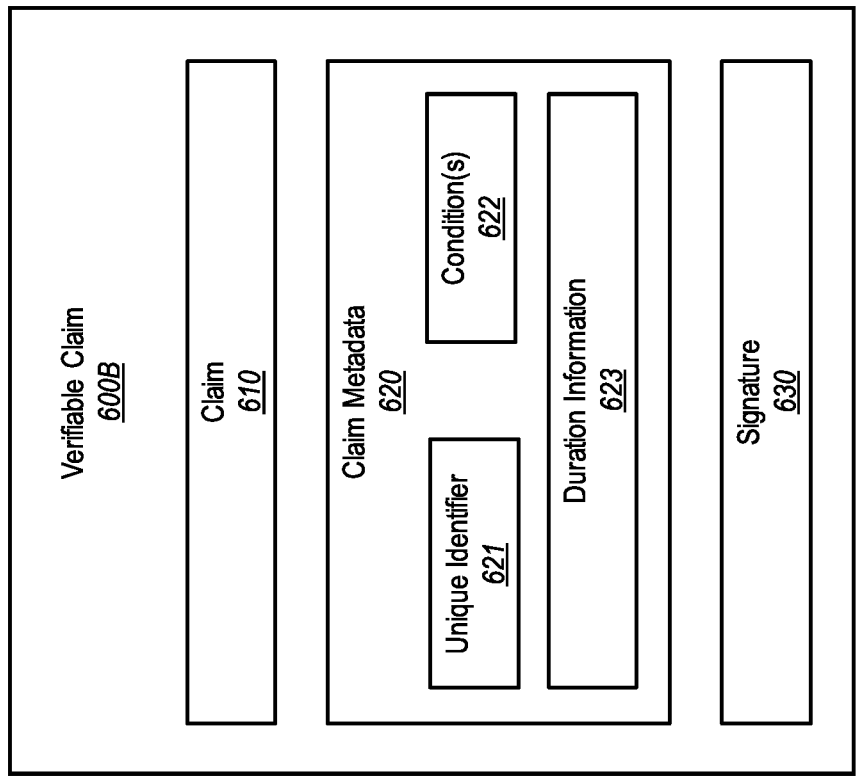
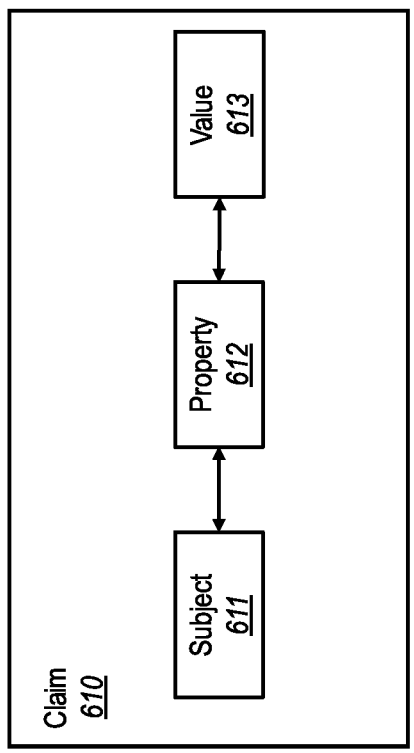
FIG. 6B
FIG. 6A

800

810 — Generate A Request For One Or More Verifiable Claims That Are Related To One Or More Services That The User Is To Provide To An Entity That Requests The One Or More Services From The User

820 — Provide The Request For The One Or More Verifiable Claims To The Entity

830 — Receive The One Or More Verifiable Claims

840 — Verify That The One Or More Verifiable Claims Are Valid

850 — Authorize That The One Or More Services Are To Be Provided To The Entity When The One Or Verifiable Claims Are Valid

*FIG. 8*

DIGITAL WALLET AS A RELYING PARTY IN A DECENTRALIZED NETWORK

CROSS-REFERENCE TO RELATED APPLICATIONS

The present application is a U.S. National Stage of International Application No. PCT/US2021/029202, filed on Apr. 26, 2021, designating the United States, and claiming the priority of Luxembourg Patent Application No. LU101758 filed with the Luxembourg Intellectual Property Office on Apr. 28, 2020. All of the aforementioned applications are incorporated herein in their respective entireties by this reference.

BACKGROUND

A digital identity is a mechanism to keep track of an entity across different digital contexts. After an identity is determined, appropriate action can be taken related to the entity that has the identity. As an example, authorizations, privileges, customizations and access can be provided to the entity. Thus, digital identities are an important mechanism to ensure that information is restricted to appropriate trust boundaries via appropriate containment of authorizations and privileges. Digital identities are also an important mechanism to ensure a positive and consistent user experience when accessing their data and customizations.

Most currently used documents or records that prove identity are issued by centralized organizations, such as governments, corporations, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. When a party needs to verify another party's identity, the verifying party often needs to go through the centralized identity management system to obtain information verifying and/or authenticating the other party's identity.

Decentralized Identifiers (DIDs) are a more recent type of identifier. Decentralized identifiers are independent of any centralized registry, identity provider, or certificate authority. Distributed ledger technology (such as blockchain) provides the opportunity for using fully decentralized identifiers. Distributed ledger technology uses distributed ledgers to record transactions between two or more parties in a verifiable way. Once a transaction is recorded, the data in the section of ledger cannot be altered retroactively without the alteration of all subsequent sections of ledger. This provides a fairly secure platform in which it is difficult or impossible to tamper with data recorded in the distributed ledger. Since a DID is generally not controlled by a centralized management system, but rather is owned by an owner of the DID, DIDs are sometimes referred to as identities without authority.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Existing computing technologies provide for a data structure called a "verifiable claim or credential". In these technologies, a claims issuer makes one or more claims about a subject, and generates the verifiable claim. The verifiable claim include those claim(s) as well as proof instructions to prove that claim(s) have not been tampered with and were indeed issued by the claims issuer. The verifiable claim also often includes duration information metadata that defines a period of time that the verifiable claim is valid for use or that defines a specific number of times that the verifiable claim is authorized for use. The claims issuer then provides the verifiable claim to a claims holder, for presentation to any relying party that relies upon the veracity of those claims.

As an example, the claims issuer might be a computing system associated with a government agency in charge of issuing driver licenses. The government agency computing system computing system may generate a verifiable claim with claims about a citizen, such as the birthdate, residence address, weight, eye color, hair color, authorization to drive, restrictions on authorization to drive, and so forth. The government agency computing system issues the verifiable claim to the citizen. If the citizen is stopped by law enforcement, a computing system of the citizen may present the verifiable claim, whereby a computing system associated with law enforcement may use the proof instructions to verify that the claims were issued by the government agency and indeed have not been tampered with since issuance. In another example, an organization that provides inoculations computing system may issue claims to a parent of a child that assert that the child has received certain inoculations. The computing system of the parent may then present these inoculation claims to a school where the child is to attend. In the above examples, the relying party was the law enforcement agency and the school the child attends or more specifically, the computing system of the law enforcement agency and the school. Since these organizations, as well as typical relying parties, are usually large business type organizations, their respective computing systems typically have large computing resources that allow for the verification of the verifiable claim or credential.

However, there are often instances where an individual user also would have need to use his or her computing system to act as a relying party when presented by a verifiable claim or credential. For example, an individual user can receive a request from a friend to borrow or rent his or her car. Before providing use of the car to the friend, the individual user would want to verify that the friend has a valid driver's license and insurance policy. To show the driver's license and insurance policy, the friend might provide verifiable claims that are related to the driver's license and insurance policy.

This presents a problem for an individual user who is not able to verify if the presented verifiable claims that are related to the driver's license and insurance policy are valid because the computing system of the user does not have the
} ability to do so since the computing system typically will not have the computing and processing resources of computing system of a large relying party. The inventors have realized that in many instances the individual user has computing system that implements a digital wallet, user agent, or management module that the individual user uses to create and manage digital identities such as DIDs. Accordingly, the inventors have aimed to solve the problems of the individual user not having a computing system with the computing resources to act as a relying party by implementing the ability to act as a relying party in the digital wallet implemented in the computing system of the individual user. By implementing the ability to act as a relying party in the digital wallet, the individual user is able to determine what types of verifiable claims he or she wants to receive before providing a service, such as lending the car to the friend, to a requesting party. This ability also allows the digital wallet to automatically generate requests for the desired verifiable claims from the requesting party, receive the verifiable claims, and then verify that the received verifiable claims are valid. Once the digital wallet determines that the verifiable claims are valid, the user can be authorized to provide the service to the requesting party. Thus, implementing the ability to act as a relying party in the digital wallet implemented in the computing system of the individual user allows the individual user to act as a relying party without the need for additional computing resources beyond that provided by the computing system of the individual user and gives the individual user the benefits of receiving and relying upon verifiable claims in interactions with other parties.

In addition, the inventors have realized that an individual user often will need portability when acting as a relying party. For instance, the friend of the individual user might ask to borrow the car while the individual user and the friend are away from a typical computing system. In such case, the individual user would not be able to use the typical computing system to determine what types of verifiable claims to request or to verify the verifiable claims. This is different from the typical large, business type relying parties, where a user wanting to receive a service from the large, business type relying party would go to the place of business, where the required computing system would be located. The inventors have aimed to solve the problem of the individual user not having access to a computing system for requesting and verifying verifiable claims when away from his or her typical computing system by implementing the ability to act as a relying party in the digital wallet. In this way, the individual user is able to request and verify verifiable claims wherever he or she is at since the digital wallet is typically implemented on a mobile phone or other mobile computing system of the individual user.

In one embodiment a request is generated for verifiable claims that are related to services that a user is to provide to an entity that requests the services from the user. The request for the services is then provided to the requesting entity. The requested verifiable claims are then received from the requesting entity and are verified to determine that they are valid. If the received verifiable claims are valid, the user is authorized to provide the services to the requesting entity.

In one embodiment, verifying that the verifiable claims are valid includes communicating with issuing entities that issued the verifiable claims to the requesting entity and then receiving confirmation from the issuing entities that the verifiable claims are valid. In another embodiment, verifying that the verifiable claims are valid includes determining that the received verifiable claims comply with the request for the verifiable claims.

In one embodiment, receiving the one or more verifiable claims includes receiving the verifiable claims from the requesting entity. In another embodiment receiving the one or more verifiable claims include receiving the verifiable claims from issuing entities that issued the one or more verifiable claims.

In one embodiment, the verifiable claims include at least (1) a Decentralized Identifier (DID), (2) a property of the subject entity, (3) a value corresponding to the property, (4) a unique identifier identifying the corresponding verifiable claims, and (5) one or more conditions for accessing the verifiable claims.

In one embodiment, prior to generating the request for verifiable claims, communication is made with a verifiable claim information service to determine what verifiable claims to include in the request.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 6A illustrates an example claim;

FIG. 6B illustrates an example verifiable claim;

FIG. 8 illustrates a flow chart of an example method for allowing a digital wallet to act as a relying party for a user who owns or controls the digital wallet, the digital wallet verifying that one or more verifiable claims are valid before one or more services are provided by the user to an entity that requests the service from the user.

DETAILED DESCRIPTION

A request is generated for verifiable claims that are related to services that a user is to provide to an entity that requests the services from the user. The request for the services is then provided to the requesting entity. The requested verifiable claims are then received from the requesting entity and are verified to determine that they are valid. If the received verifiable claims are valid, the user is authorized to provide the services to the requesting entity.

Because the principles described herein is performed in the context of a computing system, some introductory discussion of a computing system will be described with respect to FIG. 1. Then, this description will return to the principles of the embodiments disclosed herein with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that are executed by a processor. The memory takes any form and depends on the nature and form of the computing system. A computing system is distributed over a network environment and includes multiple constituent computing systems.

Figure 1:
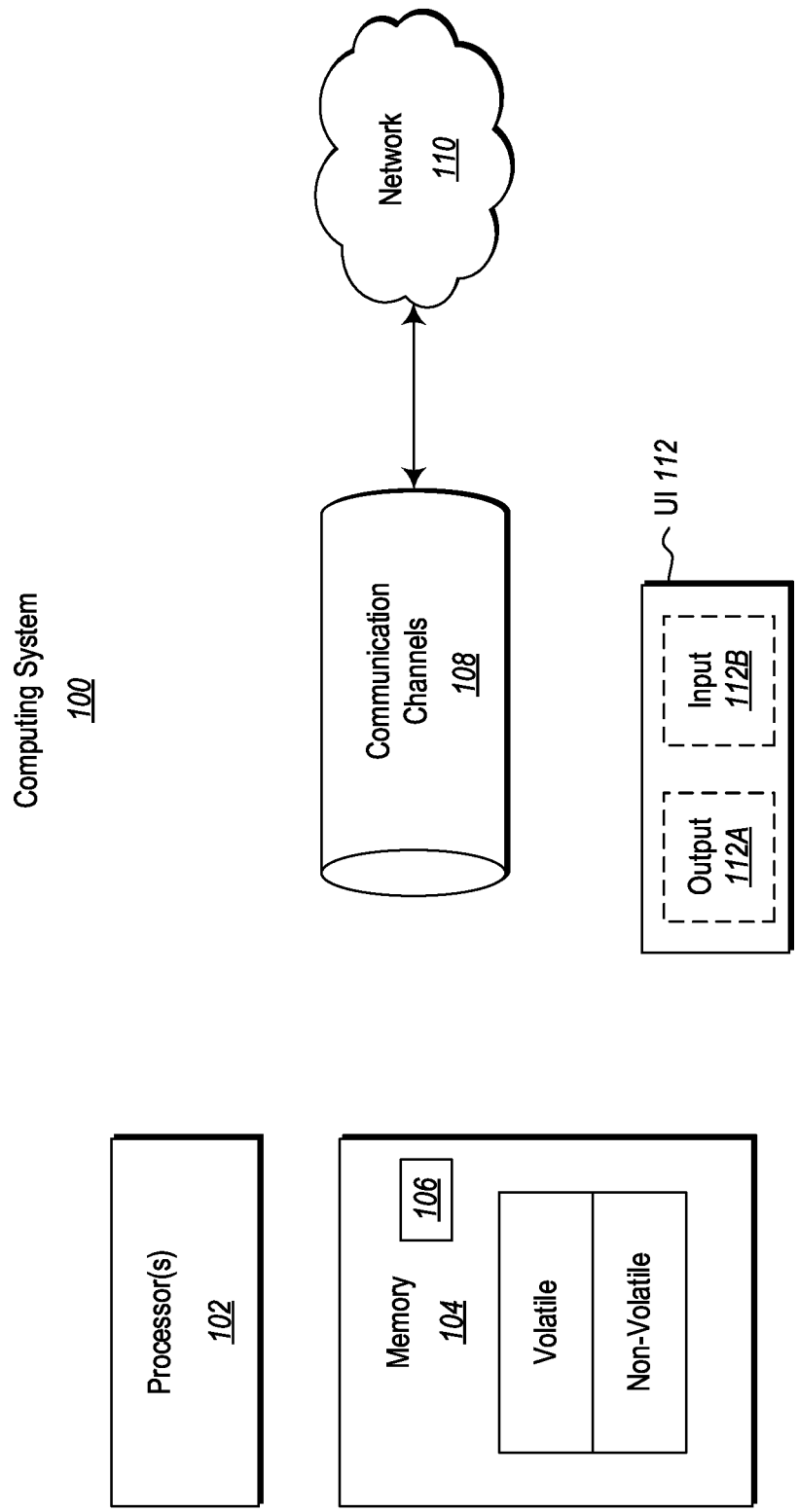
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 includes a general-purpose processor and also includes a field-programmable gate array (FPGA), an application-specific integrated circuit (ASIC), or any other specialized circuit. The memory 104 is physical system memory, which is volatile, non-volatile, or some combination of the two. The term "memory" also be used herein to refer to non-volatile mass storage such as physical storage media. If the computing system is distributed, the processing, memory and/or storage capability is distributed as well.

The computing system 100 also has thereon multiple structures often referred to as an "executable component". For instance, memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component include software objects, routines, methods, and so forth, that is executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure is computer-readable directly by the processors (as is the case if the executable component were binary). Alternatively, the structure is structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions are embodied on one or more computer-readable media that form a computer program product. An example of such an operation involves the manipulation of data. If such acts are implemented exclusively or near-exclusively in hardware, such as within an FPGA or an ASIC, the computer-executable instructions are hardcoded or hard-wired logic gates. The computer-executable instructions (and the manipulated data) is stored in the memory 104 of the computing system 100. Computing system 100 also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Embodiments described herein comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures.

Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions configure the computing system to perform a certain function or group of functions. The computer executable instructions are, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention is practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. In some cases, the invention also is practiced in distributed system environments where local and remote computing systems, which are linked (either by hardwired data links, wireless data links, or by a combination of hardwired and wireless data links) through a network, both perform tasks. In a distributed system environment, program modules are located in to both local and remote memory storage devices.

Those skilled in the art will also appreciate that the invention is practiced in a cloud computing environment. Cloud computing environments are distributed, although this is not required. When distributed, cloud computing environments are distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which corresponds to the computing system 100 previously described. The computing systems of the remaining figures include various components or functional blocks that implement the various embodiments disclosed herein as will be explained. The various components or functional blocks are implemented on a local computing system or are implemented on a distributed computing system that includes elements resident in the cloud or that implement aspects of cloud computing. The various components or functional blocks are implemented as software, hardware, or a combination of software and hardware. The computing systems of the remaining figures include more or less than the components illustrated in the figures and some of the components are combined as circumstances warrant. Although not necessarily illustrated, the various components of the computing systems access and/or utilize a processor and memory, such as processing unit 102 and memory 104, as needed to perform their various functions.

Figure 2:
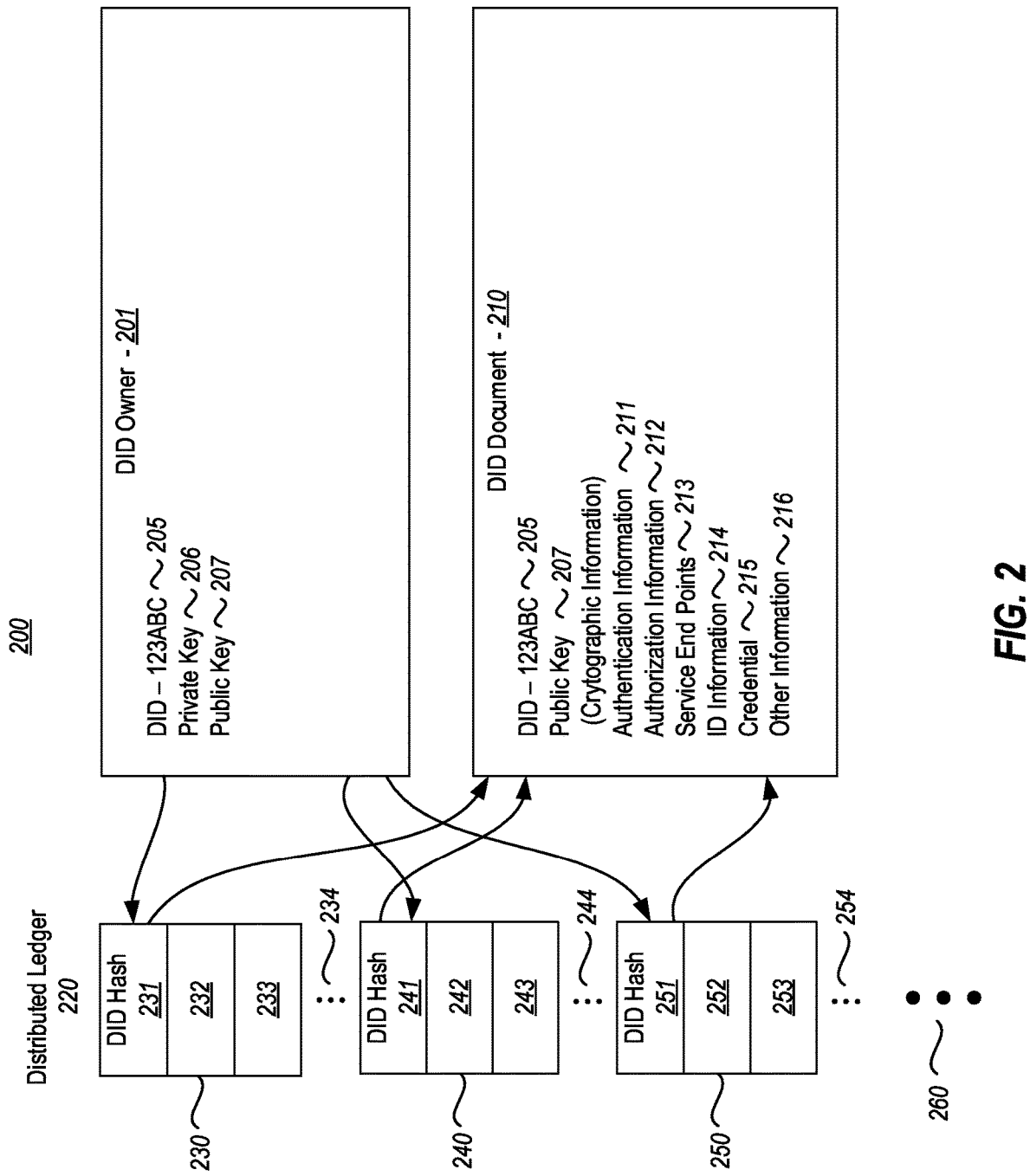
FIG. 2 illustrates an example environment for creating a decentralized identification or identifier (DID)

Some introductory discussions of a decentralized identification (DID) and the environment in which they are created and reside will now be given with respect to FIG. 2, which illustrates a decentralized network 200. As illustrated in FIG. 2, a DID owner 201 owns or controls a DID 205 that represents an identity of the DID owner 201. The DID owner 201 registers a DID using a creation and registration service, which will be explained in more detail below.

The DID owner 201 is any entity that could benefit from a DID. For example, the DID owner 201 is a human being or an organization of human beings. Such organizations might include a company, department, government, agency, or any other organization or group of organizations. Each individual human being might have a DID while the organization(s) to which each belongs might likewise have a DID.

The DID owner 201 alternatively be a machine, system, or device, or a collection of machine(s), device(s) and/or system(s). In still other embodiments, the DID owner 201 is a subpart of a machine, system or device. For instance, a device could be a printed circuit board, where the subpart of that circuit board are individual components of the circuit board. In such embodiments, the machine or device has a DID and each subpart also have a DID. A DID owner might also be a software component such as the executable component 106 described above with respect to FIG. 1. An example of a complex executable component 106 might be an artificial intelligence. An artificial intelligence also owns a DID.

Thus, the DID owner 201 is any reasonable entity, human or non-human, that is capable of creating the DID 205 or at least having the DID 205 created for and associated with them. Although the DID owner 201 is shown as having a single DID 205, this need not be the case as there is any number of DIDs associated with the DID owner 201 as circumstances warrant.

As mentioned, the DID owner 201 creates and registers the DID 205. The DID 205 is any identifier that is associated with the DID owner 201. Preferably, that identifier is unique to that DID owner 201, at least within a scope in which the DID is anticipated to be in use. As an example, the identifier is a locally unique identifier, and perhaps more desirably a globally unique identifier for identity systems anticipated to operate globally. In some embodiments, the DID 205 is a Uniform Resource Identifier (URI) (such as a Uniform Resource Locator (URL)) or other pointers that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 is any identifier that is under the control of the DID owner 201 and independent of any centralized authority.

In some embodiments, the structure of the DID 205 is as simple as a username or some other human-understandable term. However, in other embodiments, the DID 205 preferably be a random string of numbers and letters for increased security. In one embodiment, the DID 205 is a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair is generated on a device controlled by the DID owner 201. The private key 206 and public key 207 pairs should not be generated on a server controlled by any centralized authority as this causes the private key 206 and public key 207 pairs to not be fully under the control of the DID owner 201 at all times. Although FIG. 2 and this description have described a private and public key pair, it will also be noted that other types of reasonable cryptographic information and/or mechanism also be used as circumstances warrant.

FIG. 2 also illustrates a DID document 210 that is associated with the DID 205. As will be explained in more detail to follow, the DID document 210 is generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 is implemented according to methods specified by a distributed ledger 220 that will be used to store a representation of the DID 205 as will be explained in more detail to follow. Thus, the DID document 210 has different methods depending on the specific distributed ledger.

The DID document 210 also includes the public key 207 created by the DID owner 201 or some other equivalent cryptographic information. The public key 207 is used by third-party entities that are given permission by the DID owner 201 to access information and data owned by the DID owner 201. The public key 207 also be used by verifying that the DID owner 201, in fact, owns or controls the DID 205.

The DID document 210 also includes authentication information 211. The authentication information 211 specify one or more mechanisms by which the DID owner 201 is able to prove that the DID owner 201 owns the DID 205. In other words, the mechanisms of authentication information 211 show proof of a binding between the DID 205 (and thus it's DID owner 201) and the DID document 210. In one embodiment, the authentication information 211 specifies that the public key 207 be used in a signature operation to prove the ownership of the DID 205. Alternatively, or in addition, the authentication information 211 specifies that the public key 207 be used in a biometric operation to prove ownership of the DID 205. Accordingly, the authentication information 211 includes any number of mechanisms by which the DID owner 201 is able to prove that the DID owner 201 owns the DID 205.

The DID document 210 also includes authorization information 212. The authorization information 212 allows the DID owner 201 to authorize third party entities the rights to modify the DID document 210 or some part of the document without giving the third party the right to prove ownership of the DID 205. For example, the authorization information 212 allows the third party to update any designated set of one or more fields in the DID document 210 using any designated update mechanism. Alternatively, the authorization information allows the third party to limit the usages of DID 205 by the DID owner 201 for a specified time period. This is useful when the DID owner 201 is a minor child and the third party is a parent or guardian of the child. The authorization information 212 allows the parent or guardian to limit the use of the DID 205 until such time as the child is no longer a minor.

The authorization information 212 also specifies one or more mechanisms that the third party will need to follow to prove they are authorized to modify the DID document 210. In some embodiments, this mechanism is similar to those discussed previously with respect to the authentication information 211.

The DID document 210 also includes one or more service endpoints 213. A service endpoint includes a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers are used by the DID owner 201 or by third party entities to access the services that operate on behalf of the DID owner 201. Specific examples of service endpoints 213 will be explained in more detail to follow.

The DID document 210 further includes identification information 214. The identification information 214 includes personally identifiable information such as the name, address, occupation, family members, age, hobbies, interests, or the like of DID owner 201. Accordingly, the identification information 214 listed in the DID document 210 represents a different persona of the DID owner 201 for different purposes. For instance, a persona is pseudo-anonymous, e.g., the DID owner 201 include a pen name in the DID document when identifying him or her as a writer posting articles on a blog; a persona is fully anonymous, e.g., the DID owner 201 only want to disclose his or her job title or other background data (e.g., a school teacher, an FBI agent, an adult older than 21 years old, etc.) but not his or her name in the DID document; and a persona is specific to who the DID owner 201 is as an individual, e.g., the DID owner 201 includes information identifying him or her as a volunteer for a particular charity organization, an employee of a particular corporation, an award winner of a particular award, etc.

The DID document 210 also includes credential information 215, which may also be referred to herein as an attestation. The credential information 215 (also referred to as a verifiable claim) is any information that is associated with the DID owner 201's background. For instance, the credential information 215 is (but not limited to) a qualification, an achievement, a government ID, a government right such as a passport or a driver's license, a digital asset provider or bank account, a university degree or other educational history, employment status and history, or any other information about the DID owner 201's background.

The DID document 210 also includes various other information 216. In some embodiments, the other information 216 includes metadata specifying when the DID document 210 was created and/or when it was last modified. In other embodiments, the other information 216 includes cryptographic proofs of the integrity of the DID document 210. In still further embodiments, the other information 216 includes additional information that is either specified by the specific method implementing the DID document or desired by the DID owner 201.

FIG. 2 also illustrates a distributed ledger or blockchain 220. The distributed ledger 220 is any decentralized, distributed network that includes various computing systems that are in communication with each other. For example, the distributed ledger 220 includes a first distributed computing system 230, a second distributed computing system 240, a third distributed computing system 250, and any number of additional distributed computing systems as illustrated by the ellipses 260. The distributed ledger or blockchain 220 operates according to any known standards or methods for distributed ledgers. Examples of conventional distributed ledgers that correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 is stored on the actually distributed ledger. Alternatively, in other embodiments the DID document 210 is stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID has 231, DID has 241, and DID has 251, which are ideally identical copies of the same DID. The DID hash 231, DID hash 241, and DID hash 251 then point to the location of the DID document 210. The distributed ledger or blockchain 220 also store numerous other representations of other DIDs as illustrated by references 232, 233, 234, 242, 243, 244, 252, 253, and 254.

In one embodiment, when the DID owner 201 creates the DID 205 and the associated DID document 210, the DID has 231, DID has 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The DID hash 231, DID has 241, and DID has 251 includes, in addition to the pointer to the DID document 210, a record or timestamp that specifies when the DID 205 was created. At a later date when modifications are made to the DID document 210, this also is recorded in DID has 231, DID has 241, and DID has 251. The DID has 231, DID has 241, and DID hash 251 further includes a copy of the public key 207 so that the DID 205 is cryptographically bound to the DID document 210.

Figure 3:
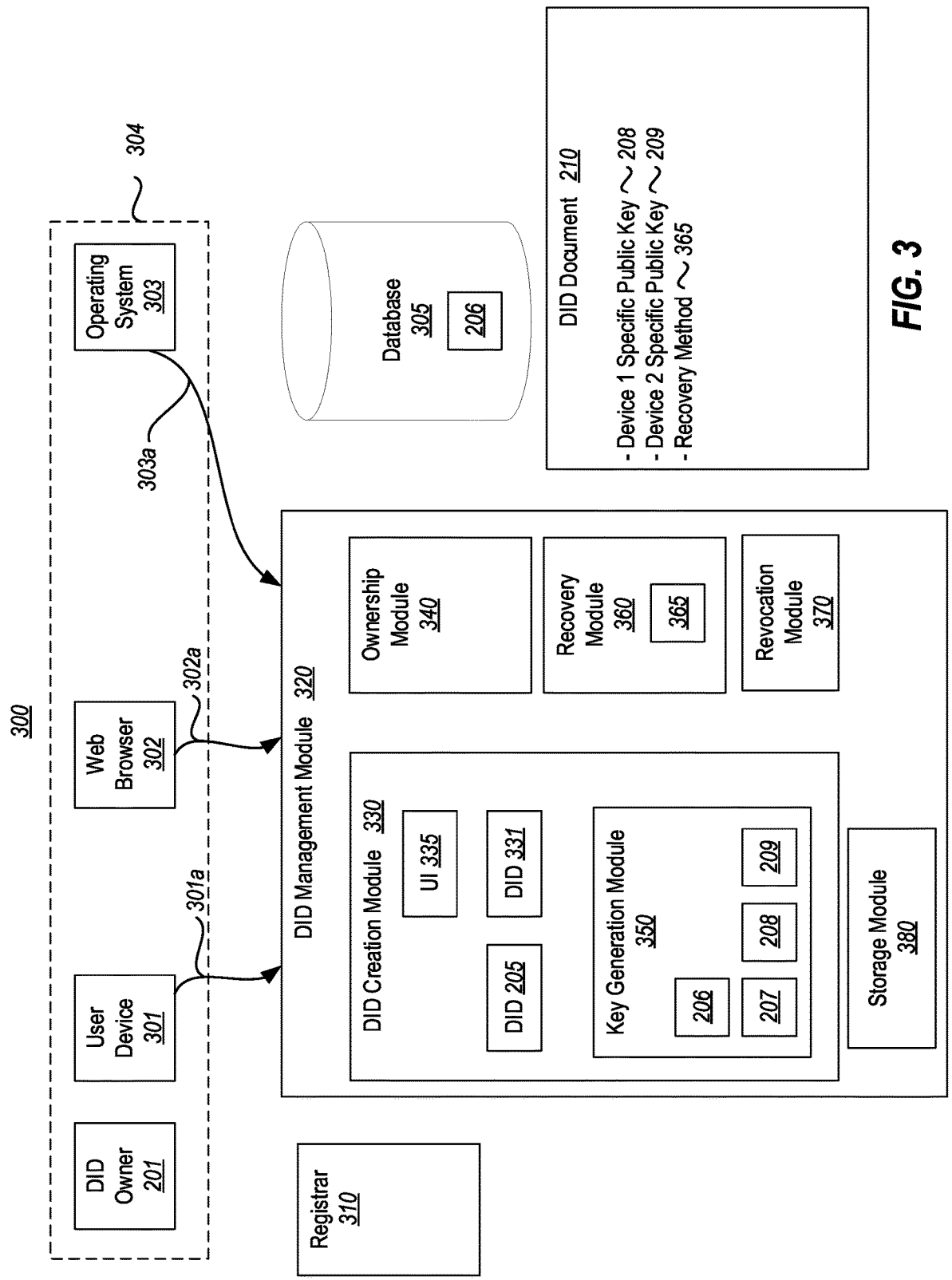
FIG. 3 illustrates an example environment for various DID management operations and services.

Having described DIDs and how they operate generally with reference to FIG. 2, specific embodiments of DID environments will now be explained. Turning to FIG. 3, a computing system environment 300 that is used to perform various DID management operations and services will now be explained. It will be appreciated that the environment of FIG. 3 reference elements from FIG. 2 as needed for ease of explanation.

As shown in FIG. 3, the computing system environment 300 includes various devices and computing systems that are owned or otherwise under the control of the DID owner 201. These include a user device 301. The user device 301 is, but is not limited to, a mobile device such as a smart phone, a computing device such as a laptop computer, or any device such as a car or an appliance that includes computing abilities. The user device 301 includes a web browser 302 operating on the device and an operating system 303 operating the device. More broadly speaking, the dashed line 304 represents that all of these devices are owned or otherwise under the control of the DID owner 201.

The computing system environment 300 also includes a DID management module 320. It will be noted that in operation, the DID management module 320 resides on and is executed by one or more of user device 301, web browser 302, and the operating system 303 as illustrated by respective lines 301a, 302a, and 303a. Accordingly, the DID management module 320 is shown as being separate for ease of explanation. In some embodiments, the DID management module 320 is referred to as a "digital wallet" or a "user agent". It will be appreciated by one of skill in the art, however, that a digital wallet or user agent can be implemented in a computing system other than the DID management module 320 in other embodiments.

As shown in FIG. 3, the DID management module 320 includes a DID creation module 330. The DID creation module 330 is used by the DID owner 201 to create the DID 205 or any number of additional DIDs, such as DID 331. In one embodiment, the DID creation module includes or otherwise has access to a User Interface (UI) element 335 that guides the DID owner 201 in creating the DID 205. The DID creation module 330 has one or more drivers that are configured to work with specific distributed ledgers such as distributed ledger 220 so that the DID 205 complies with the underlying methods of that distributed ledger.

A specific embodiment will now be described. For example, the UI 335 prompt for the user to enter a username or some other human recognizable name. This name is used as a display name for the DID 205 that will be generated. As previously described, the DID 205 is a long string of random numbers and letters and so having a human-recognizable name for a display name is advantageous. The DID creation module 330 then generates the DID 205. In the embodiments having the UI 335, the DID 205 is shown in a listing of identities and is associated with the human-recognizable name.

The DID creation module 330 also included a key generation module 350. The key generation module generates the private key 206 and public key 207 pair previously described. The DID creation module 330 uses the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record DID hash 231, DID hash 241, and DID hash 251 in the distributed ledger in the manner previously described, and to store the DID document 210 in the manner previously described. This process uses the public key 207 in the hash generation.

In some embodiments, the DID management module 320 includes an ownership module 340. The ownership module 340 provides mechanisms that ensure that the DID owner 201 is in sole control of the DID 205. In this way, the provider of the DID management module 320 is able to ensure that the provider does not control the DID 205 but is only providing the management services.

As previously discussed, the key generation module 350 generates the private key 206 and public key 207 pair and the public key 207 is then recorded in the DID document 210. Accordingly, the public key 207 is usable by all devices associated with the DID owner 201 and all third parties that desire to provide services to the DID owner 201. Accordingly, when the DID owner 201 desires to associate a new device with the DID 205, the DID owner 201 executes the DID creation module 330 on the new device. The DID creation module 330 then uses the registrar 310 to update the DID document 210 to reflect that the new device is now associated with the DID 205, which update would be reflected in a transaction on the distributed ledger 220, as previously described.

In some embodiments, however, it is advantageous to have a public key per user device 301 owned by the DID owner 201 as this allows the DID owner 201 to sign with the device-specific public key without having to access a general public key. In other words, since the DID owner 201 will use different devices at different times (for example using a mobile phone in one instance and then using a laptop computer in another instance), it is advantageous to have a key associated with each device to provide efficiencies in signing using the keys. Accordingly, in such embodiments the key generation module 350 generates additional public keys 208 and 209 when the additional devices execute the DID creation module 330. These additional public keys are associated with the private key 206 or in some instances are paired with a new private key.

In those embodiments where the additional public keys 208 and 209 are associated with different devices, the additional public keys 208 and 209 are recorded in the DID document 210 as being associated with those devices. This is shown in FIG. 3. It will be appreciated that the DID document 210 often includes the information (information 205, 207 and 211 through 216) previously described in relation to FIG. 2 in addition to the information (information 208, 209 and 365) shown in FIG. 3. If the DID document 210 existed prior to the device-specific public keys being generated, then the DID document 210 would be updated by the DID creation module 330 via the registrar 310 and this would be reflected in an updated transaction on the distributed ledger 220.

In some embodiments, the DID owner 201 often desires to keep secret the association of a device with a public key or the association of a device with the DID 205. Accordingly, the DID creation module 330 causes that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 generates an additional DID, for example DID 331, for each device. The DID creation module 330 then generates private and public key pairs and DID documents for each of the devices and has them recorded on the distributed ledger 220 in the manner previously described. Such embodiments are advantageous for devices that change ownership as it is possible to associate the device-specific DID to the new owner of the device by granting the new owner authorization rights in the DID document and revoking such rights from the old owner.

As mentioned, to ensure that the private key 206 is totally in the control of the DID owner 201, the private key 206 is created on the user device 301, web browser 302, or operating system 303 that is owned or controlled by the DID owner 201 that executed the DID management module 320. In this way, there is little chance that of a third-party (and most consequentially, the provider of the DID management module 320) gaining control of the private key 206.

However, there is a chance that the device storing the private key 206 is lost by the DID owner 201, which causes the DID owner 201 to lose access to the DID 205. Accordingly, in some embodiments, the UI 335 includes the option to allow the DID owner 201 to export the private key 206 to an off device secured database 305 that is under the control of the DID owner 201. As an example, the database 305 is one of the identity hubs 410 described below with respect to FIG. 4. A storage module 380 is configured to store data (such as the private key 206 or the credential information 215 made by or about the DID owner 201) off device in the database 305 or in the identity hubs 410 that will be described in more detail to follow. Of course, in some embodiments the storage module 380 stores at least some data on the device if the device has sufficient storage resources. In some embodiments, the private key 206 is stored as a QR code that is scanned by the DID owner 201.

In other embodiments, the DID management module 320 includes a recovery module 360 that is used to recover a lost private key 206. In operation, the recovery module 360 allows the DID owner 201 to select one or more recovery mechanisms 365 at the time the DID 205 is created that are later used to recover the lost private key. In those embodiments having the UI 335, the UI 335 allows the DID owner 201 to provide information that will be used by the one or more recovery mechanisms 365 during recovery. The recovery module 360 run on any device associated with the DID 205.

The DID management module 320 also included a revocation module 370 that is used to revoke or sever a device from the DID 205. In operation, the revocation module uses the UI 335, which allows the DID owner 201 to indicate a desire to remove a device from being associated with the DID 205. In one embodiment, the revocation module 370 accesses the DID document 210 and causes all references to the device to be removed from the DID document 210. Alternatively, the public key for the device is removed. This change in the DID document 210 is then reflected as an updated transaction on the distributed ledger 220 as previously described.

Figure 4:
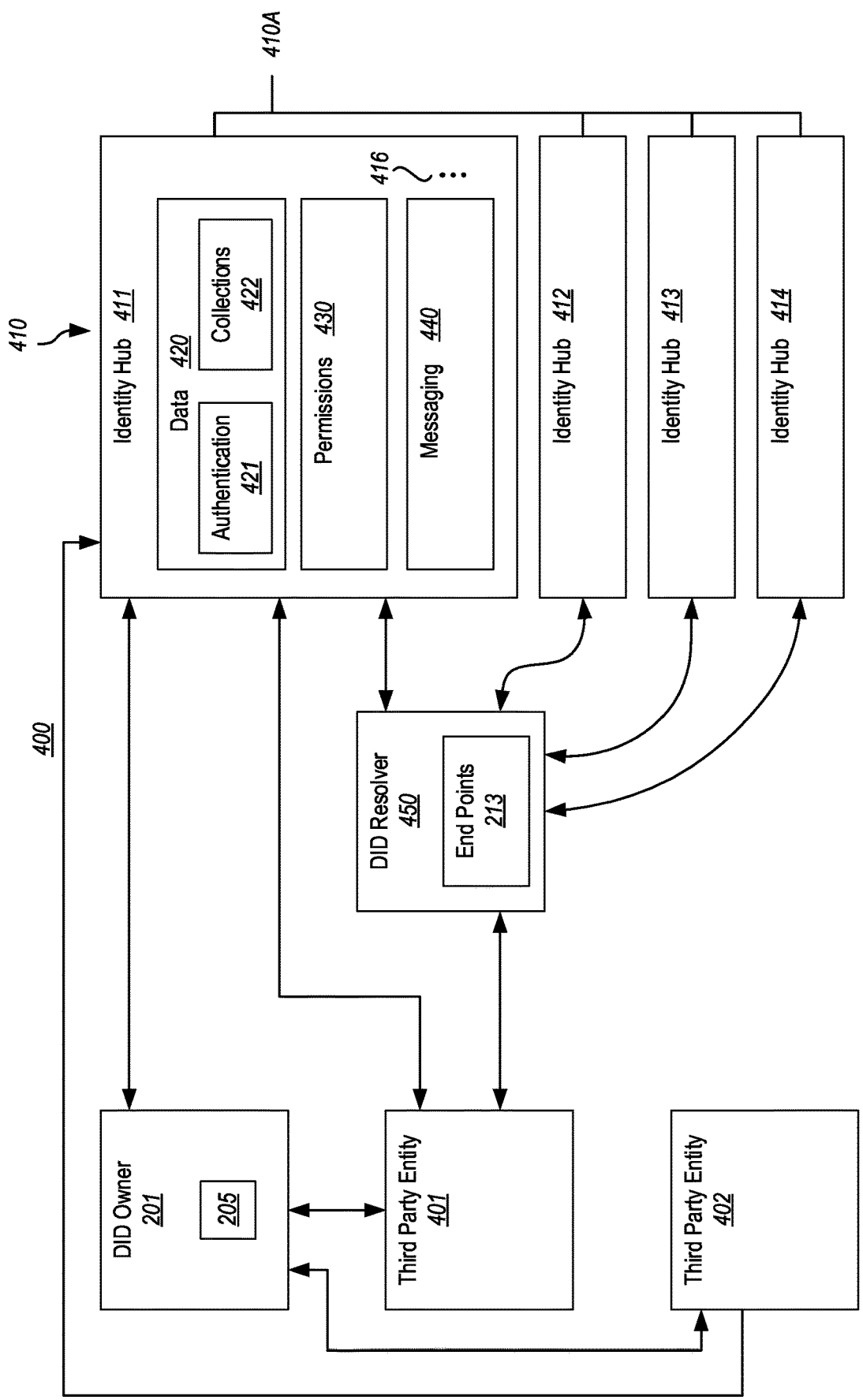
FIG. 4 illustrates an example decentralized personal storage or identity hub.

FIG. 4 illustrates an embodiment of a computing system environment 400 in which a DID such as DID 205 is utilized. Specifically, the computing system environment 400 is used to describe the use of the DID 205 in relation to one or more decentralized stores or identity hubs 410 that are each under the control of the DID owner 201 to store data belonging to or regarding the DID owner 201. For instance, data is stored within the identity hubs using the storage module 380 of FIG. 3. It will be noted that FIG. 4 includes references to elements first discussed in relation to FIG. 2 or 3 and thus uses the same reference numeral for ease of explanation.

In one embodiment, the identity hubs 410 are multiple instances of the same identity hub. This is represented by the line 410A. Thus, the various identity hubs 410 include at least some of the same data and services. Accordingly, if a change is made to part of at least some of the data (and potentially any part of any of the data) in one of the identity hubs 410, the change is reflected in one or more of (and perhaps all of) the remaining identity hubs.

The identity hubs 410 may be any data store that is in the exclusive control of the DID owner 201. As an example only, the first identity hub 411 and second identity hub 412 are implemented in cloud storage (perhaps within the same cloud, or even on different clouds managed by different cloud providers) and thus are able to hold a large amount of data. Accordingly, a full set of the data is storable in these identity hubs.

However, the identity hubs 413 and 414 may have less memory space. Accordingly, in these identity hubs a descriptor of the data stored in the first and second identity hubs is included. Alternatively, a record of changes made to the data in other identity hubs is included. Thus, changes in one of the identity hubs 410 are either fully replicated in the other identity hubs or at least a record or descriptor of that data is recorded in the other identity hubs.

Because the identity hubs are multiple instances of the same identity hub, only a full description of the first identity hub 411 will be provided as this description also applies to the identity hubs 412 through 414. As illustrated, identity hub 411 includes data storage 420. The data storage 420 is used to store any type of data that is associated with the DID owner 201. In one embodiment the data is a collection 422 of a specific type of data corresponding to a specific protocol. For example, the collection 422 may be medical records data that corresponds to a specific protocol for medical data. The collection 422 also includes other types of data, such as credential information 215 made by or about the DID owner 201.

In one embodiment, the stored data has different authentication and privacy settings 421 associated with the stored data. For example, a first subset of the data has a setting 421 that allows the data to be publicly exposed, but that does not include any authentication to the DID owner 201. This type of data is typically for relatively unimportant data such as color schemes and the like. A second subset of the data has a setting 421 that allows the data to be publicly exposed and that includes authentication to the DID owner 201. A third subset of the data has a setting 421 that encrypts the subset of data with the private key 206 and public key 207 pair (or some other key pair) associated with the DID owner 201. This type of data will require a party to have access to the public key 207 (or to some other associated public key) in order to decrypt the data. This process also includes authentication to the DID owner 201. A fourth subset of the data has a setting 421 that restricts this data to a subset of third parties. This requires that public keys associated with the subset of third parties be used to decrypt the data. For example, the DID owner 201 causes the setting 421 to specify that only public keys associated with friends of the DID owner 201 are able to decrypt this data. With respect to data stored by the storage module 380, these settings 421 are at least partially composed by the storage module 380 of FIG. 3.

In some embodiments, the identity hub 411 has a permissions module 430 that allows the DID owner 201 to set specific authorization or permissions for third parties such as third parties 401 and 402 to access the identity hub. For example, the DID owner 201 provides access permission to his or her spouse to all the data 420. Alternatively, the DID owner 201 allows access to his or her doctor for any medical records. It will be appreciated that the DID owner 201 is able to give permission to any number of third parties to access a subset of the data 420. This will be explained in more detail to follow. With respect to data stored by the storage module 380, these access permissions 430 are at least partially composed by the storage module 380 of FIG. 3.

The identity hub 411 also include a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipsis 416 represents that the identity hub 411 may have additional services as circumstances warrant.

In one embodiment, the DID owner 201 wishes to authenticate a new user device 301 with the identity hub 411 that is already associated with the DID 205 in the manner previously described. Accordingly, the DID owner 201 utilizes the DID management module 320 associated with the new user device 301 to send a message to the identity hub 411 asserting that the new user device is associated with the DID 205 of the DID owner 201.

However, the identity hub 411 is not able to initially recognize the new device as being owned by the DID owner 201. Accordingly, the identity hub 411 uses the messaging module 440 to contact the DID resolver 450. The message sent to the DID resolver 450 includes the DID 205.

The DID resolver 450 is a service, application, or module that is configured in operation to search the distributed ledger 220 for DID documents associated with DIDs. Accordingly, in the embodiment the DID resolver 450 searches the distributed ledger 220 using the DID 205, which should result in the DID resolver 450 finding the DID document 210. The DID document 210 is then provided to the identity hub 411.

As discussed previously, the DID document 210 includes a public key 208 or 209 that is associated with the new user device 301. To verify that the new user device is owned by the DID owner 201, the identity hub 411 provides a cryptographic challenge to the new user device 301 using the messaging module 440. This cryptographic challenge is structured such that only a device having access to the private key 206 will be able to successfully answer the challenge.

In this embodiment, since the new user device is owned by DID owner 201 and thus has access to the private key 206, the challenge is successfully answered. The identity hub 411 then records in the permissions 430 that the new user device 301 is able to access the data and services of the identity hub 411 and also the rest of the identity hubs 410.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 provides the DID 205 to the third-party 401 so that the third-party is able to access data or services stored on the identity hub 411. For example, the DID owner 201 is a human who is at a scientific conference who desires to allow the third-party 401, who is also a human, access to his or her research data. Accordingly, the DID owner 201 provides the DID 205 to the third-party 401.

Once the third-party 401 has access to the DID 205, he or she accesses the DID resolver 450 to access the DID document 210. As previously discussed, the DID document 210 includes a service end point 213 that is an address or pointer to services associated with the decentralized identity.

Completing the research data example, the third-party 401 sends a message to the messaging module 440 asking for permission to access the research data. The messaging module 440 sends a message to the DID owner 201 asking if the third-party 401 should be given access to the research data. Because the DID owner desires to provide access to this data, the DID owner 201 allows permission to the third-party 401 and this permission is recorded in the permissions 430.

The messaging module 440 then messages the third-party 401 informing the third-party that he or she is able to access the research data. The identity hub 411 and the third-party 401 directly communicate so that the third-party is able to access the data. It will be noted that in many cases, it will actually be an identity hub associated with the third-party 401 that communicates with the identity hub 411. However, it may be a device of the third-party 401 that does the communication.

Advantageously, the above described process allows the identity hub 411 and the third-party 401 to communicate and to share the data without the need for the third-party to access the identity hub 411 in the conventional manner. Rather, the communication is provisioned in the decentralized manner using the DID 205 and the DID document 210. This advantageously allows the DID owner to be in full control of the process.

As shown in FIG. 4, the third-party 402 also requests permission for access to the identity hub 411 using the DID 205 and the DID document 210. Accordingly, the embodiments disclosed herein allow access to any number of third parties to the identity hubs 410.

As briefly discussed above, the identity hub 411 is hosted in a cloud service. The service provider has access to the data stored in each user's identity hub 411. Furthermore, the service provider also has access to certain activities of the DID owner. For example, the entities with whom the DID owner has shared his/her data is stored in the identity hub 411. As another example, a user has multiple DIDs and has shared data amongst the multiple DIDs, alternatively, the user has used different DID management modules to access the same data. Based on the data sharing activities, the service provider of the identity hub 411 correlate the relationships of different DIDs and find out that two DIDs is related or owned by the same owner. Thus, the user's privacy is compromised.

The principles described herein will solve these potential privacy concerns of DID owners by encrypting the personal data stored in the identity hub 411. The encryption/decryption keys are not stored or accessible by the identity hub 411, so that the DID owners not only have great control over their data from other DID owners or users, but also have their privacy protected from the service providers.

There are many different objects stored in the identity hub 411. A data object is a file, a folder, or any portion of data stored in the identity hub 411. The whole identity hub 411 is encrypted with one encryption/decryption key as one object. Alternatively, a different portion of the data stored in the identity hub 411 is encrypted with different encryption/decryption keys.

In another example embodiment, verifiable claims (e.g., credential information 215) are issued and stored at the identity hub 411. For example, a verifiable claim that is associated with a DID owner 201 is issued by a claim issuing entity, and the issued verifiable claim is stored at the identity hub 411 that is associated with the DID owner 201. The DID owner 201 send the verifiable claim to another entity when the other entity requires to verify the credential of the DID owner. For example, the DID owner 201 is a person holding a driver's license, and the claim issuing entity is a DMV that has issued the DID owner's driver's license. The DMV issue a verifiable claim that verifies that the DID owner 201 is holding a valid driver's license. The DID owner 201 stores the verifiable claim in the identity hub 411. Another entity is a rental car company, which requires the DID owner 201 to show that he/she has a valid driver's license. The DID owner then sends the verifiable claim stored at the identity hub 411 to the rental car company.

Figure 5:
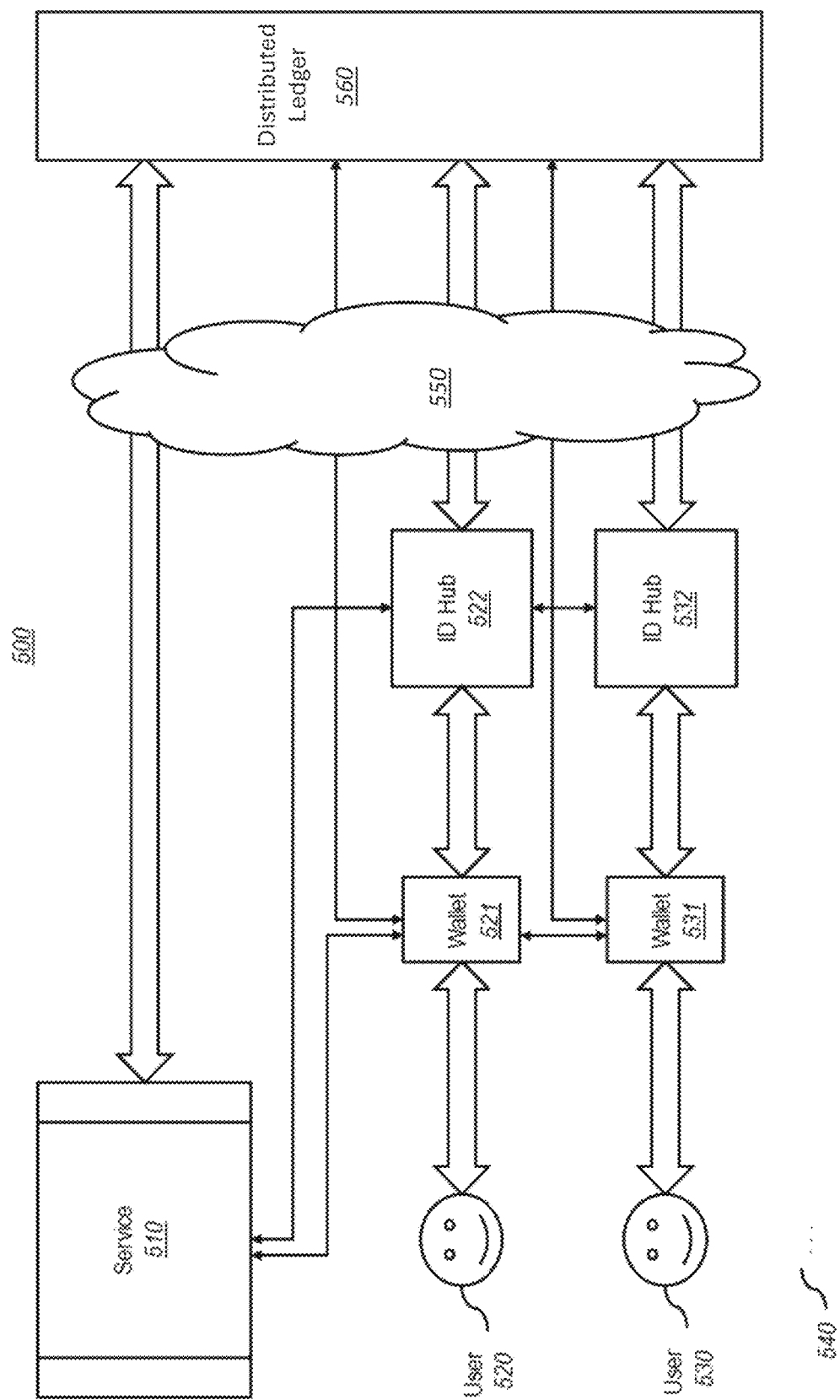
FIG. 5 illustrates an example environment, in which the principles described herein are implemented.

Having described DIDs and how they operate generally with reference to FIGS. 2-4, specific embodiments of decentralized identification will now be explained. Turning to FIG. 5, a decentralized environment 500 that allows DID owners to access services and perform transactions with other DID owners while identifying themselves will now be explained. It will be appreciated that FIG. 5 references elements from FIGS. 2-4 as needed for ease of explanation.

As illustrated in FIG. 5, the decentralized environment 500 includes a device associated with a service provider 510, a wallet apps 521 and 522 of users 520 and 530 (e.g., DID owners). The ellipsis 540 represents that there may be any number of devices associated with any number of service providers and/or users in the decentralized environment 500. Each of the service provider (s) and users 520, 530 corresponds to a DID owner 201 of FIG. 2. The wallet app 521 or 531 corresponds to the DID management module 320 of FIG. 3. The ID hub 522 or ID hub 532 corresponds to the ID hub 411 of FIG. 4.

User 520 uses a wallet app 521 to manage his/her DIDs, and user 530 uses a wallet app 531 to manage his/her DIDs. The wallet app 521 or 531 is connected to a respective ID hub 522 or 531. Each of the service provider's device 510 and wallet apps 521, 531 has access to the distributed ledger via a computer network 550. In some embodiments, the wallet app 521 or 531 has indirect access to the distributed ledger via the ID hub 522 or 532. In some embodiments, the wallet app 521 or 531 is configured to store a complete copy of the distributed ledger or has direct access to the distributed ledger via the computer network 550.

The device of the service provider 510 and each wallet apps 521, 531 and/or ID hubs 522, 532 are capable of communicating with each other via various communication channels, including, but not limited to, local area network, a wide area network, a BLE beacon signal, and/or near field communication (NFC). The communication can also be performed via generating a bar code or a QR code that by one wallet app 521, and scanning the bar code or a QR code by another wallet app 531 or the device of the service provider 510. The barcode or the QR code includes the identification information related to the user 520, such as the DID associated with the user 520.

In some embodiments, the service 510 may act as an issuer or as a relying party. As used herein, an "issuer" is an entity that makes at least one assertion about a subject. That assertion is also called herein a "claim". A "credential" is a set of one or more claims. Examples of issuers include corporations, organizations, associations, governments, agencies, individuals, or any other entity that can make assertions that could be relied upon by others. Thus, the service 510 may provide one or more verifiable claims or credentials about the user 520 or user 530, who such instance act as a "holder". The users 520 and 530 can store the verifiable claims in the ID hub 522 and ID hub 532 respectively. As used herein, a "relying party" is a party that relies on the verifiable claims or credentials so as to ascertain information about the holder and then provides a service to the holder.

For example, suppose that the service 510 is the Department of Motor Vehicles (DMV). While acting as an "issuer" the service 510 issues a verifiable claim to the user 520 that asserts that the user 520 has a valid driver's license issued by the DMV. The user 520 as the "holder" is then able to provide the verifiable claim related to the driver's license to a relaying party that needs this information. Suppose a relying party (not illustrated in this embodiment, although as mentioned above the service 510 can be a relying party in some embodiments) is a car rental agency. The user 520 presents the verifiable claim related to the driver's license to the car rental agency when he or she wants to rent a car and the car rental agency is able to use the verifiable claim related to the driver's license to ascertain that the user 520 has a valid driver's license that can be used to rent the car.

FIG. 6A illustrates an example data structure that represents a claim 610. The claim 610 includes a subject 611, a property 612 and a value 613. For example, the subject 611 corresponds to an owner of a DID (e.g. DID owner 201), and the DID (e.g. DID 205) is recorded as the subject 611. The property 612 may be any property of the owner of the DID, such as a name, a phone number, an email address, etc. The value 613 is the value of the corresponding property 612. For example, when the property is "name", the value would be the name of the owner of the DID, e.g., John Doe; when the property is "phone number", the value would be the phone number of the owner of the DID, e.g., 1-800-123-4567.

FIG. 6B illustrates an example data structure of a verifiable claim or credential 600B. In some embodiments, the data structure of the verifiable claim or credential is referred to as a Portable Identity Card (PIC) and is way for the issuer (e.g., service 510) to organize the verifiable claim in a manner that is easily understood by the user (e.g., user 520 or user 530). The verifiable claim or credential 600B includes claim 610, which corresponds to the claim 610 of FIG. 6A and includes the DID. The verifiable claim or credential 600B also includes a signature 630, which is generated by signing the claim 610 by a private key of the issuer. The signature 630 is typically a cryptographic mechanism (such as a digital signature) that is used to detect whether the verifiable claim or credential 600B has been tampered with since the time that the verifiable claim or credential 600B was issued, and can be used to verify identity of the issuer of the verifiable claim or credential 600B.

Once the verifiable claim or credential 600B is generated, at least a portion of data related to the verifiable claim or credential 600B is propagated onto a distributed ledger (e.g., 220, 560), such that a relying entity can use the portion of data propagated onto the distributed ledger to validate the verifiable claim or credential 600B. In some embodiments, the public key corresponding to the private key of the issuer is propagated onto the distributed ledger. In some embodiments, a hash of the public key or a hash of the verifiable claim or credential 600B is propagated onto the distributed ledger.

In some embodiments, the verifiable claim or credential 600B also includes various metadata related to the verifiable claim or credential 600B. For example, the metadata includes, but is not limited to, (1) a unique identifier identifying the corresponding verified claim or credential 621, (2) one or more conditions 622 for accessing the verifiable claim or credential 600B, or (3) duration information metadata 623 related to a duration of time that the issuer wants the verifiable claim or credential 600B to be valid for.

The one or more conditions metadata 622 for accessing the verifiable claim or credential 600B, but are not limited to, (1) requiring the relying entity to pay a predetermined amount of cryptocurrency, (2) requiring the relying entity to provide identification information, (3) requiring the relying entity to provide one or more verifiable claim(s), (4) requiring the relying entity to grant permission for accessing a portion of data, and/or (5) requiring the relying entity to provide a particular service.

The duration information metadata 623 includes, but is not limited to, (1) an expiration time of the corresponding verifiable claim or credential 600B, (2) a predetermined number of times that the corresponding verifiable claim or credential 600B can be accessed or used, (3) a mechanism that automatically causes the verifiable claim or credential 600B to expire in response to a directive from the issuer, or (4) a mechanism that allows the user to manually cause the verifiable claim or credential 600B to expire.

Figure 7A:
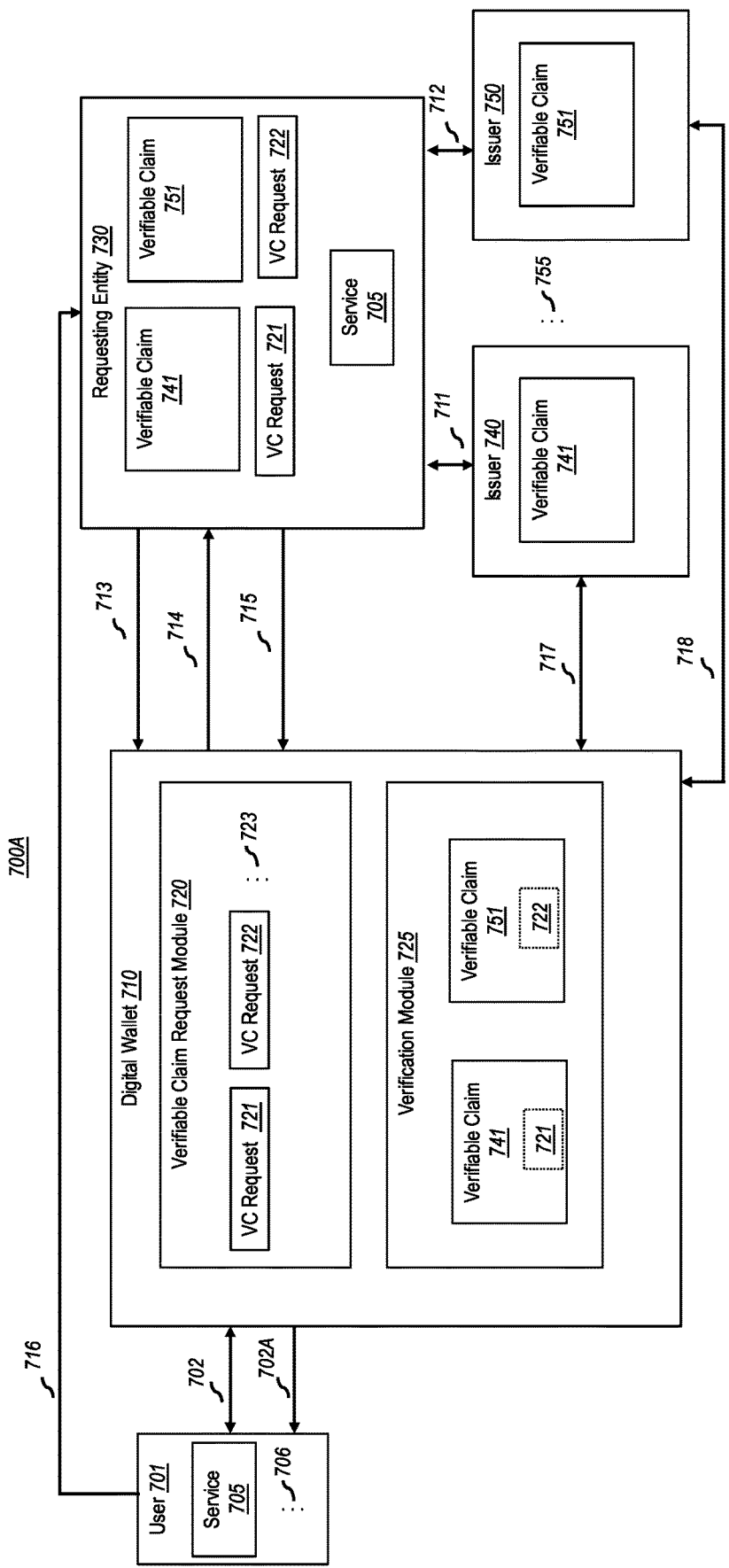
FIG. 7A illustrates an example embodiment that can be used to implement a digital wallet as a relying party for a user that controls or owns the digital wallet.

FIG. 7A illustrates an embodiment of a computing system environment 700A to that allows a user to act as a self-relying party when providing services to a requesting entity. In other words, the user, who is typically an individual user and not a large, business type user, is able to receive verifiable claims from a requesting entity, verify that that the verifiable claims are valid, and then provide a requested service based on the verifiable claim. In this way, the individual user need not rely on a the computing resources of a large, business type relying party, but rather is able to rely on the computing resources and portability of his or her digital wallet as will be explained in more detail to follow. In addition, the individual user can have the confidence that the relying party is qualified to use the service provided by the user.

As illustrated, the environment 700A includes a user 701, who corresponds to the DID owner 201 and the users 520, 530, and 540 previously described. In the embodiments disclosed herein, the user 701 is typically an individual user and not a business user. However, the embodiments disclosed herein contemplate that the user 701 can also be a business user.

The user 701 provides, controls, or is otherwise associated with a service 705 and potentially any number of additional services as illustrated by the ellipses 706. The services 705 and 706 can be a physical product such as a car, a house, an apartment, or the like that the user 701 is able to provide a requesting entity 730. The services 705 and 706 can also be a service such as ride service or a job such as yard work that the user 701 is able to provide to the requesting entity 730. Thus, the services 705 and 706 can be any type of physical product or service that the user 701 is able to provide to the requesting entity 730. Accordingly, in the embodiments disclosed herein are not limited by any particular type of the services 705 and 706.

The computing system environment 700A includes a digital wallet 710, which corresponds to the wallets 521 and 531, and the DID management module 320. The user 701 controls, owns, or is otherwise associated with a digital wallet or user agent 710. The digital wallet 710 can be implemented on a computing device associated with the user 701 such as the user device 301. As illustrated by the arrow 702, the user 701 and the digital wallet 710 are able to communicate with each other. For example, the user 701 is able to receive notifications from the digital wallet 701 and to select responses by selecting one or more user interface elements such as buttons shown on the user device 301. In the embodiments disclosed herein, the user 701 communicates to the digital wallet 710 various verifiable claims that he or she wants to obtain before providing a particular service to the requesting entity 730. As will be explained in more detail to follow, upon receiving a request for a service, the digital wallet 710 obtains the needed verifiable claim and verifies that they are valid, thus acting as a self-relying party for the user 701 and providing portability to the user 701.

The digital wallet 710 includes a verifiable claim request module 720. In operation, the verifiable claim request module 720 generates various verifiable claim (VC) requests 721, 722, and potentially any number of additional VC requests as illustrated by the ellipses 723. The VC requests 721, 722, and 723 include data that is understandable by the computing device of the requesting entity 730 and that specifies what types of verifiable claims the user 701 requires from the requesting entity 730 before providing the services 705 and/or 706 to the requesting entity. The use of the VC requests 721, 722, and 723 will be explained in more detail to follow.

The digital wallet 710 also includes a verification module 725. In operation, the verification module 725 is able to verify that the verifiable claims that are received by the digital wallet 710 from or on behalf of the requesting entity 730 are valid and comply with the VC requests 721, 722, and/or 723. The operation of the verification module 725 will be explained in more detail to follow.

The computing system environment 700A includes the requesting entity 730. In some embodiments, the requesting entity 730 is a person or group of people that desires to obtain the service 705 or 706 from the user 701. In other embodiments, the requesting entity 730 is a business entity or the like that desires to obtain the service 705 or 706 from the user 701. It will be appreciated that the use of "requesting entity" herein refers to both the computing system of the entity. Thus, when describing an action of the requesting entity 730, the action is actually performed by a computing system of the requesting entity 730.

The computing system environment 700A includes an issuer 740, an issuer 750, and any number of additional issuers as illustrated by the ellipses 755. The issuers 740, 750, and 755 correspond to the service 510 previously discussed. The issuer 740 issues, as shown by arrow 711, a verifiable claim 741 on behalf of the requesting entity 730. The issuer 750 issues, as shown by arrow 712, a verifiable claim 751 on behalf of the requesting entity 730. The verifiable claims 741 and 751 correspond to the verifiable claim or credential 600B and include information related to the requesting entity 730 as will be explained in more detail to follow. The issuer 740 can issue the verifiable claim 741 at a time previous to when the requesting entity 730 requests the service 705 from user 701 or at the time the request is made. Likewise, the issuer 750 can issue the verifiable claim 751 at a time previous to when the requesting entity 730 requests the service 705 from user 701 or at the time the request is made.

A specific use case of the computing system environment 700A will now be explained. In the specific use case, suppose that the requesting entity 730 is an individual who desires to use a car, which is an example service 705, owned by the user 701. Further suppose that the issuer 740 is a government Department of Motor Vehicles (DMV) that issues driver's licenses and that the issuer 750 is an insurance company that has sold a car insurance policy to the requesting entity 730.

As shown by arrow 713, the requesting entity 730 makes a request to use the car (i.e., service 705). The request 713 can be the result of the user 701 advertising use of the car over a network such as the decentralized network 200. Alternatively, the request 713 can be initiated by the requesting entity 730. For example, the requesting entity 730 is a friend of the user 701 and desires to borrow his or her car.

The digital wallet 710 receives the request 713. In response, the verifiable claim request module 720 reads the request 713 to understand what type of service 705 is being requested and then generates VC request that are related to the type of service being requested. In the present use case, since the request 713 is for use of the car, the verifiable claim request module 720 will generate various VC requests for verifiable claims that are related to the use of (i.e., borrowing or renting) the car of the user 701. For example, the verifiable claim request module 720 generates a VC request 721 that is understandable by the computing device of the requesting entity 730 and that specifies that the user 701 desires a verifiable claim that shows an identity of the requesting entity 730 and shows that the requesting entity 730 has a valid, government issued driver's license. In addition, the verifiable claim request module 720 generates a VC request 722 that is understandable by the computing device of the requesting entity 730 and that specifies that the user 701 desires a verifiable claim that shows that the requesting entity 730 has a valid car insurance policy that will cover any liability and damage caused by an accident while the requesting entity 730 is driving the car. The verifiable claim request module 720 can also generate any number of additional VC requests 723 that are related to the use of the car as needed. As shown by arrow 714, the VC request 721 and the VC request 722 are then provided to the requesting entity 730.

Upon receipt of the VC request 721 and the VC request 722, the requesting entity 730 reads the VC requests to determine what verifiable claims are being requested by the digital wallet 710. In the present use case, the requesting entity 730 determines from the VC request 721 that a verifiable claim that shows an identity and driver's license is required before the requesting entity can use the car. Accordingly, the requesting party determines that he or she needs to obtain a verifiable claim 741 from the issuer 740 (i.e., DMV) that specifies the identity of the requesting entity 730 and that the requesting entity 730 has a valid driver's license.

Likewise, in the present use case the requesting entity 730 determines from the VC request 722 that a verifiable claim that shows has a valid car insurance policy that will cover any liability and damage caused by an accident while the requesting entity 730 is driving the car is required before the requesting entity can use the car. Accordingly, the requesting party determines that he or she needs to obtain a verifiable claim 751 from the issuer 750 (i.e., car insurance company) that specifies the requesting entity 730 has the valid car insurance policy.

In one embodiment, as shown by arrow 711, the requesting entity 730 contacts the issuer 740 to obtain the verifiable claim 741 and, as shown by arrow 712, contacts the issuer 750 to obtain the verifiable claim 751 at the time the VC requests 721 and 722 are received from the digital wallet 710. In such embodiment, the issuer 740 will issue the verifiable claim 741 and the issuer 750 will issue the verifiable claim 751. Both verifiable claims are then provided to the requesting entity 730.

In another embodiment, however, the verifiable claim 741 and the verifiable claim 751 are provided to the requesting entity 730 at a time prior to receiving the VC requests 721 and 722. In this embodiment, the verifiable claim 741 and the verifiable claim 751 are stored in an identity hub, such as the identity hubs 410 discussed previously, or other storage of the requesting entity 730. The requesting entity 730 accesses the verifiable claim 741 and the verifiable claim 751 from the identity hub upon receipt of the VC requests 721 and 722. Regardless of if the requesting entity 730 accesses the verifiable claim 741 and the verifiable claim 751 from the identity hub or other storage or receives the verifiable claims at the time of receiving the VC requests 721 and 722 from the issuers 740 and 750, as shown by arrow 715 the requesting entity 730 provides the verifiable claim 741 and the verifiable claim 751 to the digital wallet 710.

The verification module 725 receives the verifiable claim 741 and the verifiable claim 751 from the requesting entity 730. The verification module 725 then verifies if the verifiable claim 741 is valid and complies with the VC request 721 and if the verifiable claim 751 is valid and complies with the VC request 722. For example, in one embodiment the verification module 725 analyzes the verifiable claim 741 to determine if the verifiable claim 741 includes information about the identity of the requesting entity 730 and if he or she has a valid driver's license that was requested by the VC request 721. In the present use case, since the verifiable claim 741 is issued by the issuer 740 (i.e., the DMV), the verifiable claim 741 includes the identity of the requesting entity 730 and includes the driver's license. Accordingly, the verifiable claim 741 complies with the VC request 721. In FIG. 7A (and FIGS. 7B-7D) the verifiable claim 741 that is being analyzed by the verification module 725 includes a dashed box denoted as 721. This is used for ease of explanation and represents that the verifiable claim 741 complies with the VC request 721, but does not imply that the verifiable claim 741 includes the VC request 721.

Likewise, the verification module 725 analyzes the verifiable claim 751 to determine if the verifiable claim 751 includes information about the car insurance policy that was requested by the VC request 722. In the present use case, since the verifiable claim 751 is issued by the issuer 750 (i.e., the car insurance company), the verifiable claim 751 includes the car insurance policy. Accordingly, the verifiable claim 451 complies with the VC request 722. In FIG. 7A (and FIGS. 7B-7D) the verifiable claim 751 that is being analyzed by the verification module 725 includes a dashed box denoted as 722. This is used for ease of explanation and represents that the verifiable claim 751 complies with the VC request 721, but does not imply that the verifiable claim 751 includes the VC request 722.

The verification module 725 also determines if the verifiable claims 741 and 751 are still valid. This is especially useful in those embodiments where the verifiable claims were issued to the requesting entity 730 at a time prior to receiving the VC requests and then stored in the identity hub or other storage as in the intervening time until the VC requests are received the verifiable claims could become invalid for various reasons. In one embodiment, the verification module 725 analyzes duration information metadata such as duration information metadata 623 included in the verifiable claims 741 and 751 to determine if the verifiable claim has expired and is thus no longer valid. If the duration information metadata has not expired, then the verifiable claim is likely still valid or at least has not expired.

In other embodiments, the verification module 725 communicates with issuer 740 and/or the issuer 750 to receive confirmation that the verifiable claims are still valid. For example, even if the duration information metadata has not expired, it is possible that the issuer 740 has revoked the verifiable claim 741 if the requesting entity 730 has had his or her driver's license revoked for various traffic infractions. Accordingly, as shown by arrow 717, the verification module 725 communicates with the issuer 740 to receive confirmation that the verifiable claim 741 is valid. If the driver's license has not been revoked, then the issuer 740 should confirm the validity of the verifiable claim 741. In addition, the user 701 may desire to know if the requesting entity 730 has a large number of traffic points associated with the driver's license as this indicates how safe a driver the requesting entity 730 is. Accordingly, the issuer 740 can also provide information about the driving history of the requesting entity 730 to help determine if the requesting entity 730 should be given use of the user 701's car.

It is also possible that the requesting entity 730 has allowed the car insurance policy to lapse because of non-payment or has had it revoked because of poor driving since the issuance of the verifiable claim 751 even though the duration information metadata has not expired. Accordingly, as shown by arrow 718, the verification module 725 communicates with the issuer 750 to receive confirmation that the verifiable claim 751 is valid. If the car insurance policy has not been revoked or allowed to lapse, then the issuer 750 should confirm the validity of the verifiable claim 751. In addition, the user 701 may desire to know if the requesting entity 730 has a large number insurance claims made against the insurance policy as this indicates how safe a driver the requesting entity 730 is. Accordingly, the issuer 750 can also provide information about the number of insurance claims to help determine if the requesting entity 730 should be given use of the user 701's car.

In the present case, the verification module 725 verifies that the verifiable claim 741 complies with the VC request 721 and is still valid. In addition, the verification module 725 verifies that the verifiable claim 751 complies with the VC request 722 and is still valid. In response to this, the digital wallet 710 provides a notification to the user 701 as shown by arrow 702A that the verifiable claims are valid. The notification can be a message on a user interface associated with the digital wallet. The notification 702A acts as authorization that the car (i.e., the service 705) can be provided by the user 701 to the requesting entity 730 since the verifiable claims 741 and 751 are valid. The user 701 then provides the car (i.e., the service 705) to the requesting entity 730 as shown by the arrow 716.

Figure 7B:
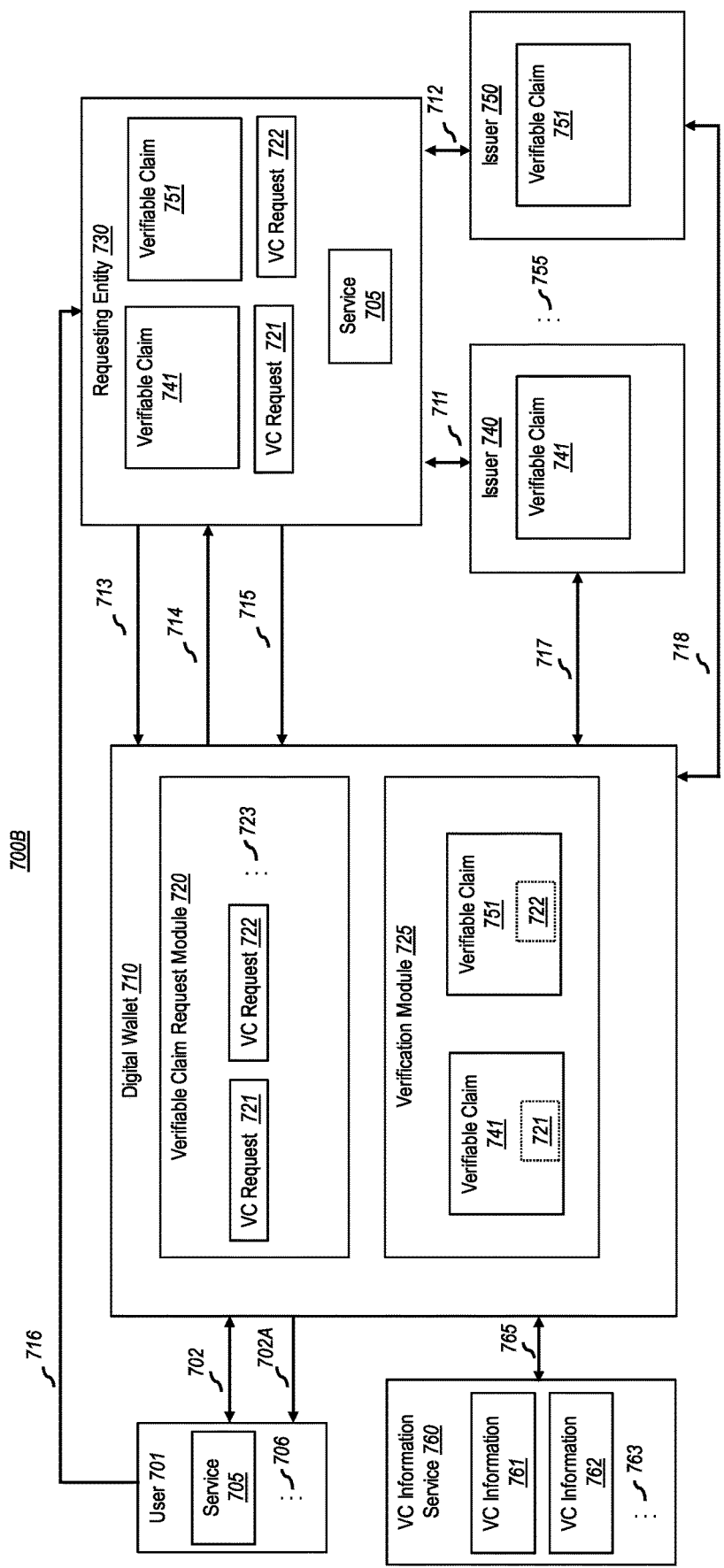
FIG. 7B illustrates an alternative embodiment of the environment of FIG. 7A.

FIG. 7B illustrates an embodiment of a computing system environment 700B that is a modification of the computing system environment 700A of FIG. 7A. Accordingly, elements that were described in relation to computing system environment 700A need not be described again in relation to computing system environment 700B since they are the same in both embodiments.

In some embodiments, the user 701 does not know ahead of time what types of verifiable claims he or she should obtain from the requesting entity 730 prior to providing the service 705 or 706 to the requesting entity 730. Accordingly, in such embodiments the digital wallet 710 communicates as shown by arrow 765 with a VC information service 760 to determine what types of verifiable claims should be obtained. The VC information service 760 is typically implemented by a third party cloud provider such as the provider of the identity hubs 410 or the management module 320.

In operation, the VC information service 760 provides information about what types of verifiable claims should be obtained for a given request. For example, the VC information service 760 provides VC information 761, VC information 762, and potentially any number of additional VC information as illustrated by the ellipses 763. The VC information is then used to determine what types of verifiable claims to request. The VC information 761-763 can be provided to the digital wallet 710 at the time a request for a service is made by the requesting entity 730 or it can be provided at an earlier time when the user 701 is determining what types of verifiable claims to obtain for providing a given service.

For example, in the use case discussed in relation to FIG. 7A, the digital wallet 710 can contact the VC information service 760 to determine what types of verifiable claims should be obtained before providing use of the car to the requesting entity 730. In this case, the VC information 761 specifies that a verifiable claim related to a driver's license of the requesting entity 730 should be obtained. In addition, the VC information 762 specifies that a verifiable claim related to a car insurance policy of the requesting entity 730 should also be obtained. The VC information 761 and 762 is then used by the digital wallet 710 to generate the VC request 721 and VC request 722. As discussed previously, the VC requests 721 and 722 are then used to request the verifiable claims 741 and 751.

Figure 7C:
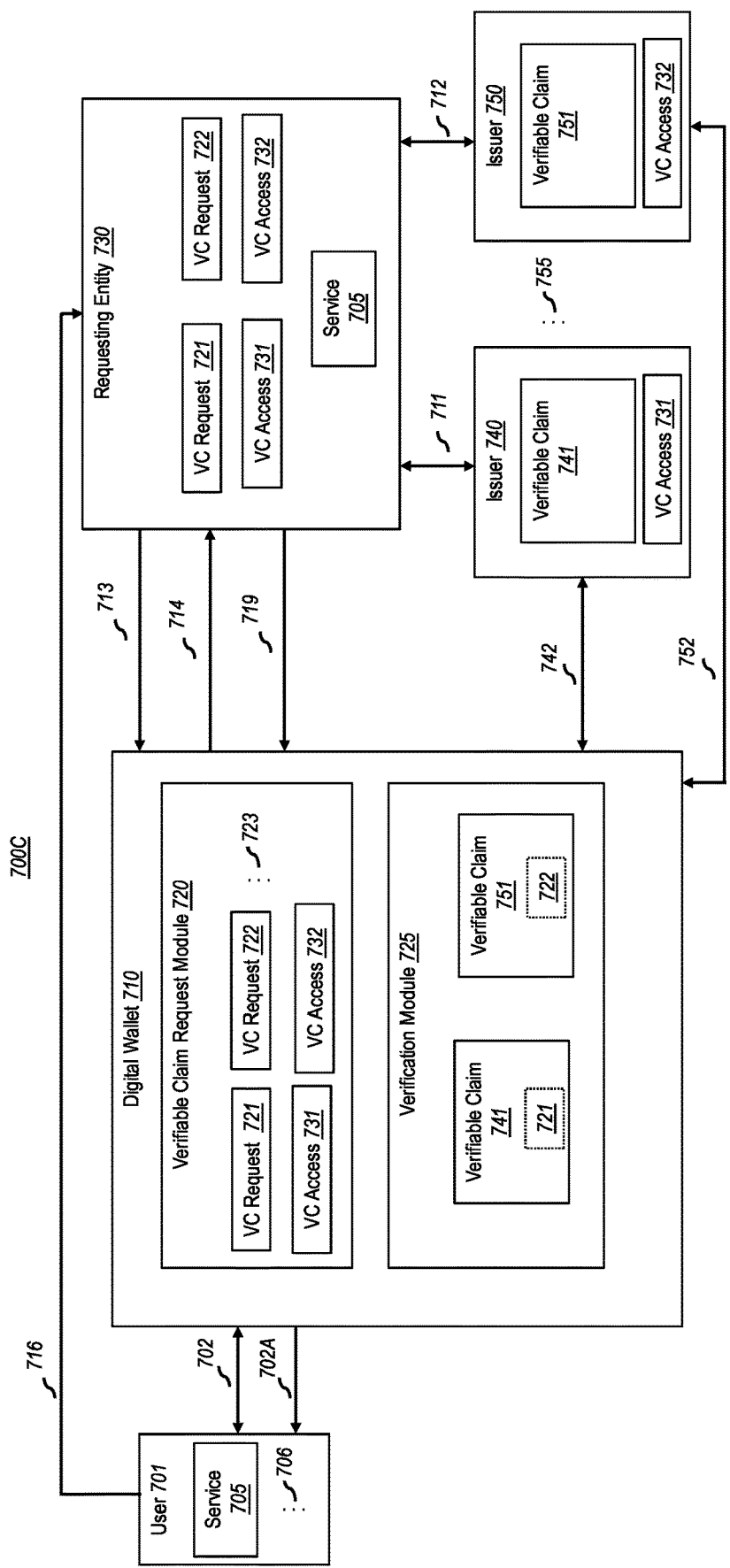
FIG. 7C illustrates an alternative embodiment of the environment of FIG. 7A.

FIG. 7C illustrates an embodiment of a computing system environment 700C that is a modification of the computing system environment 700A of FIG. 7A. Accordingly, elements that were described in relation to computing system environment 700A need not be described again in relation to computing system environment 700C since they are the same in both embodiments.

As discussed in relation to FIG. 7A, the verifiable claims 741 and 751 can be provided the requesting entity 730 to the digital wallet 710. However, this need not always be the case. As illustrated in FIG. 7C, in some embodiments the digital wallet 710 receives the verifiable claims 741 and 751 from the issuer 740 and the issuer 750.

As in the use case discussed in relation to FIG. 7A, the requesting entity 730 makes the request for use of the car (i.e., the service 705) as shown by arrow 713 and the verifiable claim request module 720 generates and provides the VC requests 721 and 722 to the requesting party as shown by arrow 714. In this embodiment, however, the requesting entity 730 does not send the verifiable claims 741 and 751 to the digital wallet 710. Instead, the requesting entity 730 provides a VC access information 731 and VC access information 732 to the digital wallet 710 as shown by arrow 719. The VC access information 731 includes information that indicates that the requesting entity 730 consents to the digital wallet 710 communicating with issuer 740 so as to have the issuer 740 provide the verifiable claim 741 to the digital wallet 710. The VC access information 732 includes information that indicates that the requesting entity 730 consents to the digital wallet 710 communicating with issuer 750 so as to have the issuer 750 provide the verifiable claim 741 to the digital wallet 710.

As shown by arrow 742, the digital wallet 710 provides the VC access information 731 to the issuer 740. The issuer 740 analyzes the VC access information 731 and if it consents, generates and provides the verifiable claim 741 on behalf of the requesting entity 730 to the verification module 725. Likewise, as shown by arrow 752, the digital wallet 710 provides the VC access information 732 to the issuer 750. The issuer 750 analyzes the VC access information 732 and if it consents, generates and provides the verifiable claim 751 on behalf of the requesting entity 730 to the verification module 725. The verification module 725 then verifies if the verifiable claims comply with the VC requests 721 and 722 in the manner previously described. Since the verifiable claims 741 and 751 are provided directly from the issuer 740 and the issuer 750, the verification module 725 typically need not verify that the verifiable claims are still valid since it is unlikely that the issuers would provide invalid verifiable claims.

Figure 7D:
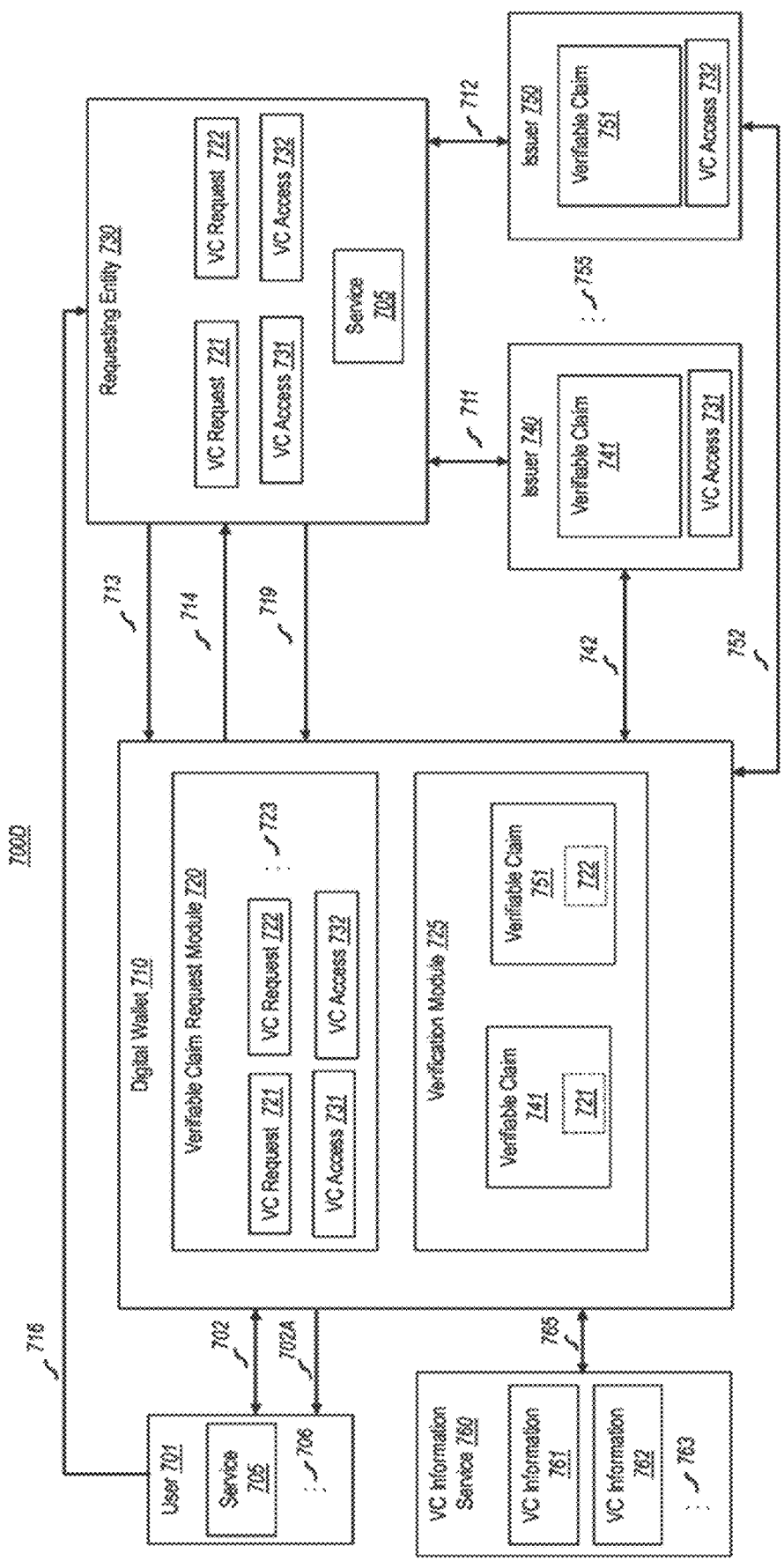
FIG. 7D illustrates an alternative embodiment of the environment of FIGS. 7A-7C.

FIG. 7D illustrates an embodiment of a computing system environment 700D that is a modification of the previously described computing system environments 700A-700C. Accordingly, elements that were described in relation to computing system environments 700A-700C need not be described again in relation to computing system environment 700D. FIG. 7D shows that in the embodiments where the verifiable claims are received from the issuer 740 and the issuer 750, the digital wallet 710 is able to communicate as shown by arrow 765 with a VC information service 760 to determine what types of verifiable claims should be obtained as previously described.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 8 illustrates a flow chart of an example method 800 for allowing a digital wallet to act as a relying party for a user who owns or controls the digital wallet, the digital wallet verifying that one or more verifiable claims are valid before one or more services are provided by the user to an entity that requests the service from the user. The method 800 will be described with respect to one or more of FIGS. 2-7 discussed previously.

The method 800 includes generating a request for one or more verifiable claims that are related to one or more services that the user is able to provide to an entity that requests the one or more services from the user (810). For example, as previously discussed the verifiable claim request module 720 of the digital wallet 710 generates the VC requests 721 and 722. The VC requests are generated in response to a request 713 from the requesting entity 730 for a service 705 and/or 706 from the user 701.

The method 800 includes providing the request for the one or more verifiable claims to the entity (820). For example, as previously discussed the verifiable claim request module 720 of the digital wallet 710 provides the VC requests 721 and 722 to the requesting entity 730 as shown by arrow 714.

The method 800 includes receiving the one or more verifiable claims 830). For example, as previously discussed the verification module 725 of the digital wallet 710 receives the verifiable claims 741 and 751. In one embodiment, the verifiable claims 741 and 751 are received from the requesting entity 730 as shown by arrows 715. In another embodiment, the verifiable claims 741 and 751 are received from the issuer 740 and the issuer 750 as shown by arrows 742 and 752.

The method 800 includes verifying that the one or more verifiable claims are valid (840). For example, as previously discussed the verification module 725 of the digital wallet 710 verifies that the verifiable claims 741 and 751 are valid. In some embodiments this is done by analyzing duration information metadata to determine if the verifiable claims have expired. In other embodiments, this is done by determining that verifiable claims 741 and 751 comply with the VC requests 721 and 722. In still other embodiments, the verification module 725 communicated with the issuer 740 as shown by arrow 717 and with the issuer 750 as shown by arrow 718 and receives confirmation that the verifiable claims 741 and 751 are valid.

The method 800 includes authorizing that the one or more services are to be provided to the entity when the one or verifiable claims are valid (850). For example, as previously discussed the digital wallet 710 provides a notification to the user 701 as shown by arrow 702A that the verifiable claims are valid. The notification 702A acts as authorization that the service 705 (e.g., the user 701's car) can be provided by the user 701 to the requesting entity 730 since the verifiable claims 741 and 751 are valid. The user 701 then provides the service 705 to the requesting entity 730 as shown by the arrow 716.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for allowing a digital wallet to manage one or more decentralized identification (DID) documents of a user corresponding to the computer system and to act as a relying party for verifying that a verifiable claim is valid before a service is provided to a requesting entity that requests the service, the computing system comprising:

one or more processors; and
one or more computer-readable storage media having thereon computer-executable instructions that comprise the digital wallet and that are structured such that, when executed by the one or more processors, cause the computing system to:
generate a private key;
generate a first public key and a second public key;
associate the first and second public keys with the private key such that the private key is associated with at least two different public keys, wherein the first public key is associated with a first user device of the user and the second public key is associated with a second user device of the user;
use the private key and at least one of the first and second public keys to generate a decentralized identification (DID) document that is stored in a first data storage associated with a distributed ledger;
store the first and second public keys in the DID document, wherein the DID document indicates that the first public key is associated with the first user device and further indicates that the second public key is associated with the second user device;
access an identity hub that includes a second data storage, wherein the second data storage stores data associated with the user;
encrypt the data stored in the second data storage using the private key and at least one of the first public key or the second public key associated with the user, wherein the encrypted data is subsequently decryptable using said at least one of the first public key or the second public key;
receive a service request for the service, the service request being received from a requesting computing system of the requesting entity;
generate a claim request for the verifiable claim that is related to the service, wherein the verifiable claim is comprised within a DID document of the requesting entity, and wherein the verifiable claim is to be issued to the requesting computing system by an issuing computing system of an issuer;
provide the claim request for the verifiable claim to the requesting entity, causing the requesting computing system to contact the issuing computing system, resulting in the issuing computing system issuing the verifiable claim to the requesting computing system;
receive the verifiable claim from the requesting computing system, wherein the verifiable claim includes a data structure comprising a claim, a unique identifier, and a cryptographic signature, and wherein the claim includes a subject, a property, and a value corresponding to the property;
verify that the verifiable claim is valid; and
authorize that the service is to be provided to the requesting entity in response to verifying that the verifiable claim is valid.

2. The computing system of claim 1, wherein verifying that the verifiable claim is valid comprises:
   receiving confirmation that the verifiable claim is valid.

3. The computing system of claim 1, wherein verifying that the verifiable claim is valid comprises:
   determining that the verifiable claim complies with the claim request.

4. The computing system of claim 1, wherein the verifiable claim comprises at least one or more conditions for accessing the verifiable claim.

5. The computing system of claim 1, wherein the computing system is further caused to:
   prior to generating the claim request, communicating with a verifiable claim information service to determine what one or more verifiable claims to include in the claim request.

6. A method for allowing a digital wallet to manage one or more decentralized identification (DID) documents and to act as a relying party for verifying that a verifiable claim is valid before a service is provided to a requesting entity that requests the service, the method comprising:
   generating a private key;
   generating a first public key and a second public key;
   associating the first and second public keys with the private key such that the private key is associated with at least two different public keys, wherein the first public key is associated with a first user device of a user and the second public key is associated with a second user device of the user;
   using the private key and at least one of the first and second public keys to generate a decentralized identification (DID) document that is stored in a first data storage associated with a distributed ledger;
   storing the first and second public keys in the DID document, wherein the DID document indicates that the first public key is associated with the first user device and further indicates that the second public key is associated with the second user device;
   accessing an identity hub that includes a second data storage, wherein the second data storage stores data associated with the user;
   encrypting the data stored in the second data storage using the private key and at least one of the first public key or the second public key associated with the user, wherein the encrypted data is subsequently decryptable using said at least one of the first public key or the second public key;
   receiving a service request for the service, the service request being received from a requesting computing system of the requesting entity;
   generating a claim request for the verifiable claim that is related to the service, wherein the verifiable claim is comprised within a DID document of the requesting entity, and wherein the verifiable claim is to be issued to the requesting computing system by an issuing computing system of an issuer;
   providing the claim request for the verifiable claim to the requesting entity, causing the requesting computing system to contact the issuing computing system, resulting in the issuing computing system issuing the verifiable claim to the requesting computing system;
   receiving the verifiable claim from the requesting computing system, wherein the verifiable claim includes a data structure comprising a claim, a unique identifier, and a cryptographic signature, and wherein the claim includes a subject, a property, and a value corresponding to the property;
   verifying that the verifiable claim is valid; and
   authorizing that the service is to be provided to the requesting entity in response to verifying that the verifiable claim is valid.

7. The method of claim 6, wherein verifying that the verifiable claim is valid comprises:
   receiving confirmation that the verifiable claim is valid.

8. The method of claim 6, wherein verifying that the verifiable claim is valid comprises:
   determining that the verifiable claim complies with the claim request.

9. The method of claim 6, wherein the verifiable claim comprises one or more conditions for accessing the verifiable claim.

10. The method of claim 6, further comprising:
    prior to generating the claim request, communicating with a verifiable claim information service to determine what one or more verifiable claims to include in the claim request.

11. A computer program product comprising one or more computer-readable hardware storage devices having thereon computer-executable instructions that comprise a digital wallet and that are executable by one or more processors of a computing system for configuring the computing system to allow the digital wallet to manage one or more decentralized identification (DID) documents of a user corresponding to the computing system and to act as a relying party for verifying that a verifiable claim is valid before a service is provided to a requesting entity that requests the service, by at least configuring the computing system to:
    generate a private key;
    generate a first public key and a second public key;
    associate the first and second public keys with the private key such that the private key is associated with at least two different public keys, wherein the first public key is associated with a first user device of the user and the second public key is associated with a second user device of the user;
    use the private key and at least one of the first and second public keys to generate a decentralized identification (DID) document that is stored in a first data storage associated with a distributed ledger;
    store the first and second public keys in the DID document, wherein the DID document indicates that the first public key is associated with the first user device and further indicates that the second public key is associated with the second user device;
    access an identity hub that includes a second data storage, wherein the second data storage stores data associated with the user;
    encrypt the data stored in the second data storage using the private key and at least one of the first public key or the second public key associated with the user, wherein the encrypted data is subsequently decryptable using said at least one of the first public key or the second public key;
    receive a service request for the service, the service request being received from a requesting computing system of the requesting entity;
    generate a claim request for the verifiable claim that is related to the service, wherein the verifiable claim is comprised within a DID document of the requesting entity, and wherein the verifiable claim is to be issued to the requesting computing system by an issuing computing system of an issuer;
    provide the claim request for the verifiable claim to the requesting entity, causing the requesting computing system to contact the issuing computing system, resulting in the issuing computing system issuing the verifiable claim to the requesting computing system;

receive the verifiable claim from the requesting computing system, wherein the verifiable claim includes a data structure comprising a claim, a unique identifier, and a cryptographic signature, and wherein the claim includes a subject, a property, and a value corresponding to the property;

verify that the verifiable claim is valid; and authorize that the service is to be provided to the requesting entity in response to verifying that the verifiable claim is valid.

12. The computer program product of claim 11, wherein verifying that the verifiable claim is valid comprises:

receiving confirmation that the verifiable claim is valid.

13. The computer program product of claim 11, wherein verifying that the verifiable claim is valid comprises:

determining that the verifiable claim complies with the claim request.

14. The computer program product of claim 11, wherein the verifiable claim comprises one or more conditions for accessing the verifiable claim.

15. The computer program product of claim 11, wherein the computing system is further caused to:

prior to generating the claim request, communicating with a verifiable claim information service to determine what verifiable claims to include in the claim request.

* * * * *